US012406270B2

(12) United States Patent
Redden

(10) Patent No.: US 12,406,270 B2
(45) Date of Patent: Sep. 2, 2025

(54) SOCIAL EQUITY RENEWABLE ENERGY CREDIT DATASTRUCTURES AND DISTRIBUTED GENERATION ENGINE APPARATUSES, PROCESSES AND SYSTEMS

(71) Applicant: DCR Group LLC, Atlanta, GA (US)

(72) Inventor: Dana Clare Redden, Atlanta, GA (US)

(73) Assignee: DCR GROUP LLC, Atlanta, GA (US)

( * ) Notice: Subject to any disclaimer, the term of this patent is extended or adjusted under 35 U.S.C. 154(b) by 0 days.

(21) Appl. No.: 18/164,114

(22) Filed: Feb. 3, 2023

(65) Prior Publication Data

US 2023/0245135 A1     Aug. 3, 2023

Related U.S. Application Data

(63) Continuation-in-part of application No. 17/592,483, filed on Feb. 3, 2022.

(60) Provisional application No. 63/145,979, filed on Feb. 4, 2021.

(51) Int. Cl.
*G06Q 30/018*     (2023.01)

(52) U.S. Cl.
CPC .................................. *G06Q 30/018* (2013.01)

(58) Field of Classification Search
CPC ........ G06Q 30/018; G06Q 50/06; Y02P 90/84
See application file for complete search history.

(56) References Cited

U.S. PATENT DOCUMENTS

| 2008/0091581 A1* | 4/2008 | Kremen | G06Q 40/00 705/35 |
| 2010/0082499 A1* | 4/2010 | Luff | G06Q 30/018 705/317 |
| 2010/0100405 A1* | 4/2010 | Lepore | G06Q 30/0601 705/26.1 |
| 2010/0332373 A1* | 12/2010 | Crabtree | G06Q 40/04 709/224 |

(Continued)

OTHER PUBLICATIONS

Kingsley, J. (2015). Closing California's Climate Gap: Understanding SB 535 Funding Allocations to Disadvantaged Communities. Occidental College, 1-92. (Year: 2015).*

(Continued)

*Primary Examiner* — John S. Wasaff
(74) *Attorney, Agent, or Firm* — Leason Ellis LLP

(57) ABSTRACT

Disclosed herein are systems and method for streamlining renewable energy resource allocation. A method may include: receiving, from a user via a user interface, a request to view project and community information for a renewable energy project that reduces greenhouse gas emissions; identifying, from a plurality of renewable energy projects in a project database, a first renewable energy project located in a first community; determining a relevance score by comparing a first set of project attributes including budgetary and energy-based information of the first renewable energy project and a first set of community attributes including economical and demographical information of the first community with a set of user attributes including community preferences and project goals of the user; in response to determining that the relevance score is greater than a threshold relevance score, generating, for display on the user interface, project and community information for the first renewable energy project.

26 Claims, 16 Drawing Sheets

(56) References Cited

U.S. PATENT DOCUMENTS

| | | | | |
|---|---|---|---|---|
| 2011/0093420 A1* | 4/2011 | Rothenberg | ........... | G06Q 10/06 706/45 |
| 2012/0023037 A1* | 1/2012 | Allderdice | ............ | G06Q 40/10 705/36 R |
| 2012/0095794 A1* | 4/2012 | Guthridge | ............ | G06Q 10/063 705/7.11 |
| 2014/0222698 A1* | 8/2014 | Potdar | .................. | G06Q 30/018 705/317 |
| 2015/0339762 A1* | 11/2015 | Deal | ................. | G06Q 30/0283 705/27.1 |
| 2016/0203569 A1* | 7/2016 | Forbes, Jr. | ........... | G06Q 20/145 705/34 |
| 2019/0372345 A1* | 12/2019 | Bain | ...................... | H02J 3/381 |
| 2020/0372588 A1* | 11/2020 | Shi | ......................... | G06Q 50/06 |
| 2021/0240151 A1* | 8/2021 | Yaffe | .................... | G05B 19/042 |
| 2023/0018298 A1* | 1/2023 | Caperton | ............ | G06F 16/2379 |

OTHER PUBLICATIONS

Chaurey, A., Ranganathan, M., & Mohanty, P. (2004). Electricity access for geographically disadvantaged rural communities—technology and policy insights. Energy policy, 32(15), 1693-1705. (Year: 2004)*

\* cited by examiner

400

SOLAR STEWARDS — Enter Query Here — SEARCH

Project Finder

SOLAR IN PHILLY

Site Graphics 502

SITE INFORMATION

Transactions 510

Site Details 504

City and State: Philadelphia
County: Philadelphia
Site Type: City Government
People Served Annually: 500-1000

Community Partner Info 506
Owner Name: John Doe
Owner Email: ABC123@email.com
Organization Website:
www.solarstewards.net Price per MWH: $75
Term: 5 years
Est Annual MWH: 500

$800

PLACE BID

Required Deposit: $0
36 days, 9 hours, 42 minutes, 6 seconds, remaining
Bids: 0

Specifics 508

Status: Operational
Expected COD: December 27, 2023
Energy Burden: 4%
Features Micro-Inventers, Other
Grid Connection: Yes
Grid Utility Company: PECO

Communications 511

CONTACT

SOCIAL IMPACT

Communities Served 512
-Persistent Poverty
-Historically Redlined

Mission 514
-Affordable/Senior Housing
-Non-Profit/NGO

People Served 516
-Low Income
-Moderate Income
-Energy Burdened

COUNTY DATA

| TOTAL POPULATION | TOTAL HOUSEHOLDS | AGE |

SOCIAL EQUITY RENEWABLE ENERGY CREDIT DATASTRUCTURES AND DISTRIBUTED GENERATION ENGINE APPARATUSES, PROCESSES AND SYSTEMS

CROSS-REFERENCE TO RELATED APPLICATIONS

This application is a continuation-in-part of U.S. Non-Provisional application Ser. No. 17/592,483 filed on Feb. 3, 2022, and further claims the benefit of U.S. Provisional Application No. 63/145,979 filed on Feb. 4, 2021, which is herein incorporated by reference.

FIELD OF TECHNOLOGY

The present disclosure is directed to systems and methods that mitigate climate-related issues such as disparities in access to renewable energy resources amongst underserved communities.

BACKGROUND

To make a lasting impact on climate change, there needs to be a united adoption of renewable energy. If only a portion of humanity makes beneficial changes in their lifestyle while another portion does not, the effects of climate change will continue to worsen. Unfortunately, the decision to make beneficial changes is not as easy for certain groups of people. Throughout history, various underprivileged groups of people have suffered social and economic disadvantages such as redlining for various goods and services (e.g., lack of broadband/telephony access, lack of renewable energy access). If underprivileged groups cannot adopt renewable energy resources simply because they are not given access, climate change cannot be actively combated.

Currently, corporations are exploring new "stakeholder-capitalism" models based on the priorities of social and environmental conscious consumers and shareholders. Corporate Social Responsibility (CSR), Environmental Social Governance (ESG) and Diversity, Equity, and Inclusion (DEI) are increasingly valuable to a triple-bottom line.

Embracing the competitive advantages of CSR, ESG, and DEI, corporations are seeking opportunities to innovate and create additional value within existing climate commitments. Traditionally, these commitments have been met by procuring utility-scale renewable energy, far removed from communities of benefit. Even with the recent passing of the Inflation Reduction Act (IRA), which creates additional tax credit opportunities for "Energy Communities," the benefits of renewable assets need to be realized directly by those historically excluded.

To ensure Historically Excluded Communities (0HECs) can benefit from private-sector commitments to renewable energy development, there needs to be a platform allowing corporates looking to meet their climate action and equity goals to view the needs of HECs. In particular, there exists a need for a system that can provide users (e.g., corporates) with the relevant information needed to ultimately provide renewable energy resources to HECs and, in turn, mitigate the effects of climate change.

SUMMARY

Aspects of the disclosure describe methods and systems for streamlining renewable energy resource allocation via a user interface.

In one exemplary aspect, the techniques described herein relate to a method for streamlining renewable energy resource allocation, the method including: receiving, from a user via a user interface, a request to view project and community information for a renewable energy project that reduces greenhouse gas emissions; identifying, from a plurality of renewable energy projects in a project database, a first renewable energy project located in a first community; retrieving, from the project database, a first set of project attributes including budgetary and energy-based information of the first renewable energy project, and a first set of community attributes including economical and demographical information of the first community; retrieving, from a user profile, a set of user attributes including community preferences and project goals of the user; determining a relevance score of the first renewable energy project to the user by comparing the first set of project attributes and the first set of community attributes with the set of user attributes; in response to determining that the relevance score is greater than a threshold relevance score, generating, for display on the user interface, project and community information for the first renewable energy project; and executing a subsequent request, received via the user interface from the user, to allocate resources into the first renewable energy project.

In some aspects, the techniques described herein relate to a method, further including: in response to determining that the relevance score is not greater than the threshold relevance score, generating project and community information of a second renewable energy project for display on the user interface.

In some aspects, the techniques described herein relate to a method, wherein generating the project and community information of the second renewable energy project is further in response to determining that another relevance score of the second renewable energy project is greater than the threshold relevance score.

In some aspects, the techniques described herein relate to a method, wherein determining the another relevance score includes: retrieving, from the project database, a second set of project attributes of the second renewable energy project, and a second set of community attributes of a second community where the second renewable energy project is located; and determining the another relevance score of the second renewable energy project to the user by comparing the second set of project attributes and the second set of community attributes with the set of user attributes.

In some aspects, the techniques described herein relate to a method, further including prior to receiving the request: receiving, via the user interface, a request to generate the user profile; generating, for display on the user interface, a plurality of queries that request information about community preferences and project goals of the user; and building the set of user attributes based on received responses to the plurality of queries.

In some aspects, the techniques described herein relate to a method, wherein the community preferences in the set of user attributes includes, for a given community, at least one of: (1) a user-set population limit, (2) a user-set racial distribution, (3) a user-set wealth distribution, (4) a user-set gender distribution, (5) an indication of being underserved, (6) a user-set energy usage distribution.

In some aspects, the techniques described herein relate to a method, wherein the first set of community attributes includes, for a given community, at least one of: (1) a community population, (2) a racial distribution, (3) a wealth distribution, (4) a gender distribution, (5) an indication of being underserved or not underserved, (6) an energy usage distribution.

In some aspects, the techniques described herein relate to a method, wherein the project goals in the set of user attributes includes, for a given renewable energy project, at least one of: (1) a user-set project cost limit, (2) a user-set energy generation value, (3) a user-set renewable energy type, (4) a user-set energy efficiency value, (5) a user-set project time window.

In some aspects, the techniques described herein relate to a method, wherein the first set of project attributes includes, for a given renewable energy project, at least one of: (1) a project cost, (2) an energy generation value, (3) a renewable energy type, (4) an energy efficiency value, (5) a project time window.

In some aspects, the techniques described herein relate to a method, further including: determining a respective relevance score for each of the plurality of renewable energy projects to the user; ranking each respective relevance score from highest to lowest; and generating, for display on the user interface, respective project and community information for the plurality of renewable energy projects based on the ranking.

In some aspects, the techniques described herein relate to a method, wherein determining the relevance score of the first renewable energy project to the user includes executing a machine learning model configured to receive an input set of user attributes and generate an output relevance score.

In some aspects, the techniques described herein relate to a method, wherein the machine learning model is trained based on a training dataset including a plurality of input user attributes, input project attributes, input community attributes, and output indicators of relevance.

In some aspects, the techniques described herein relate to a method, wherein the resources to allocate are monetary funds, and wherein the subsequent request is a request to buy the first renewable energy project.

It should be noted that the methods described above may be implemented in a system comprising a hardware processor. Alternatively, the methods may be implemented using computer executable instructions of a non-transitory computer readable medium.

In some aspects, the techniques described herein relate to a system for streamlining renewable energy resource allocation, including: a memory; and a hardware processor communicatively coupled with the memory and configured to: receive, from a user via a user interface, a request to view project and community information for a renewable energy project that reduces greenhouse gas emissions; identify, from a plurality of renewable energy projects in a project database, a first renewable energy project located in a first community; retrieve, from the project database, a first set of project attributes including budgetary and energy-based information of the first renewable energy project, and a first set of community attributes including economical and demographical information of the first community; retrieve, from a user profile, a set of user attributes including community preferences and project goals of the user; determine a relevance score of the first renewable energy project to the user by comparing the first set of project attributes and the first set of community attributes with the set of user attributes; in response to determining that the relevance score is greater than a threshold relevance score, generate, for display on the user interface, project and community information for the first renewable energy project; and execute a subsequent request, received via the user interface from the user, to allocate resources into the first renewable energy project.

In some aspects, the techniques described herein relate to a non-transitory computer readable medium storing thereon computer executable instructions for streamlining renewable energy resource allocation, including instructions for: receiving, from a user via a user interface, a request to view project and community information for a renewable energy project that reduces greenhouse gas emissions; identifying, from a plurality of renewable energy projects in a project database, a first renewable energy project located in a first community; retrieving, from the project database, a first set of project attributes including budgetary and energy-based information of the first renewable energy project, and a first set of community attributes including economical and demographical information of the first community; retrieving, from a user profile, a set of user attributes including community preferences and project goals of the user; determining a relevance score of the first renewable energy project to the user by comparing the first set of project attributes and the first set of community attributes with the set of user attributes; in response to determining that the relevance score is greater than a threshold relevance score, generating, for display on the user interface, project and community information for the first renewable energy project; and executing a subsequent request, received via the user interface from the user, to allocate resources into the first renewable energy project.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 5 is the exemplary user interface presenting information about a selected project.

FIG. 7 is the exemplary user interface outputting projects that are relevant to the user based on the received profile information.

DETAILED DESCRIPTION

The Social Equity Renewable Energy Credit Datastructures and Distributed Generation Engine Apparatuses, Processes and Systems (hereinafter "SERECDG") transforms inputs, via SERECDG components (e.g., Climate Steward Collector, Community Collector, Allocation Engine, etc. components), into community apportionment values outputs. The SERECDG components, in various embodiments, implement advantageous features as set forth below.

The SERECDG provides unconventional features (e.g., obtain, via the at least one processor, an energy equity participation request datastructure for the benefit of an underserved community; obtain a climate steward site datastructure from an energy production site; obtain a climate steward request datastructure from an energy production site, including: an energy credit donation value; obtaining a transfer of the energy credit donation value based the climate steward identifier and the energy credit donation value; determine apportionment values for community identifiers based on collected energy credit donation values and energy equity participation request; provide apportionment values to requesting communities' energy credit account identifier accounts based on their community identifier) that were never before available in environmental clean energy.

Figure 1:
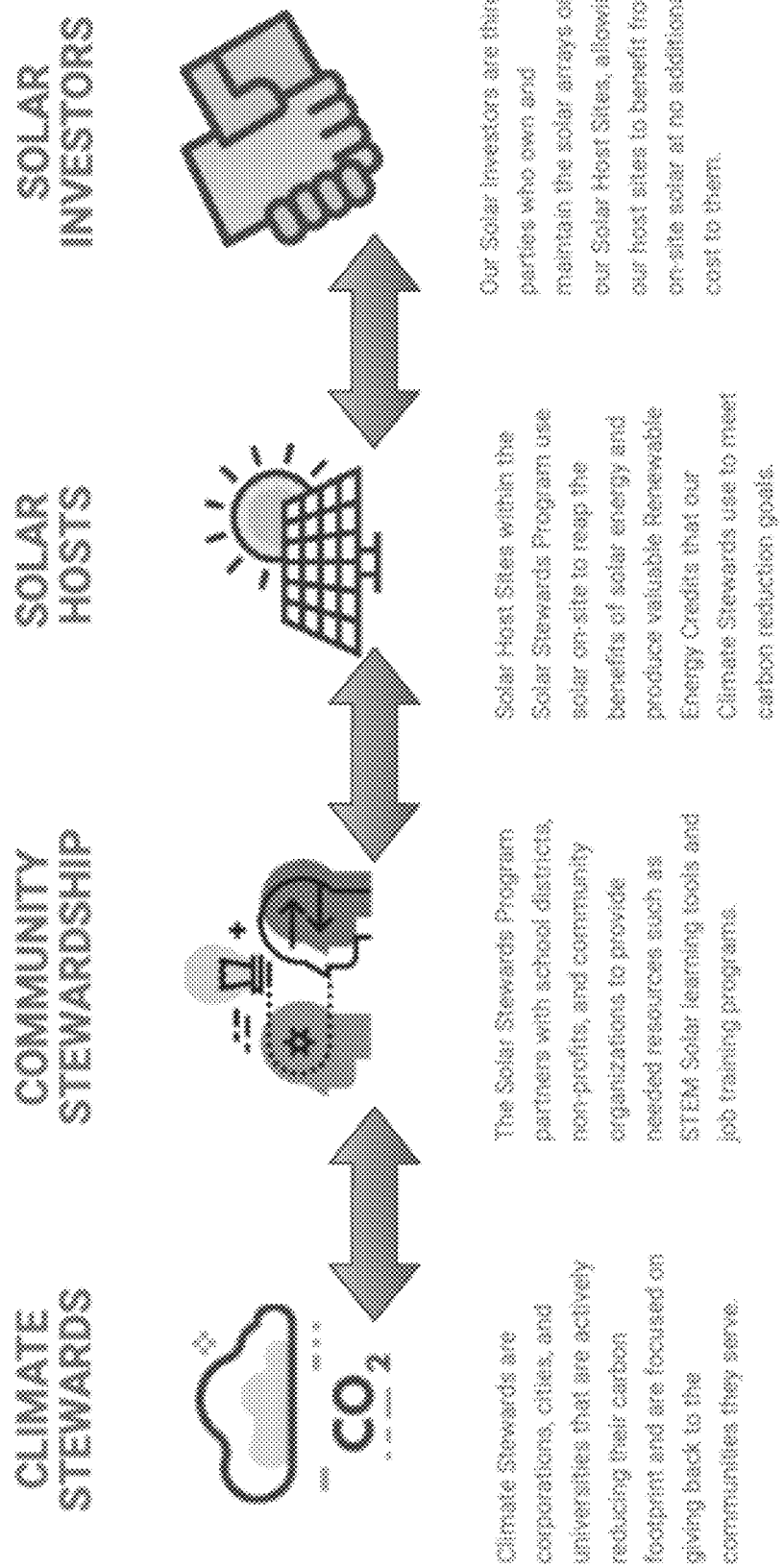
FIG. 1 shows a datagraph illustrating data flow(s) for the Social Equity Renewable Energy Credit Datastructures and Distributed Generation Engine Apparatuses, Processes and Systems (hereinafter "SERECDG").
Figure 2A:
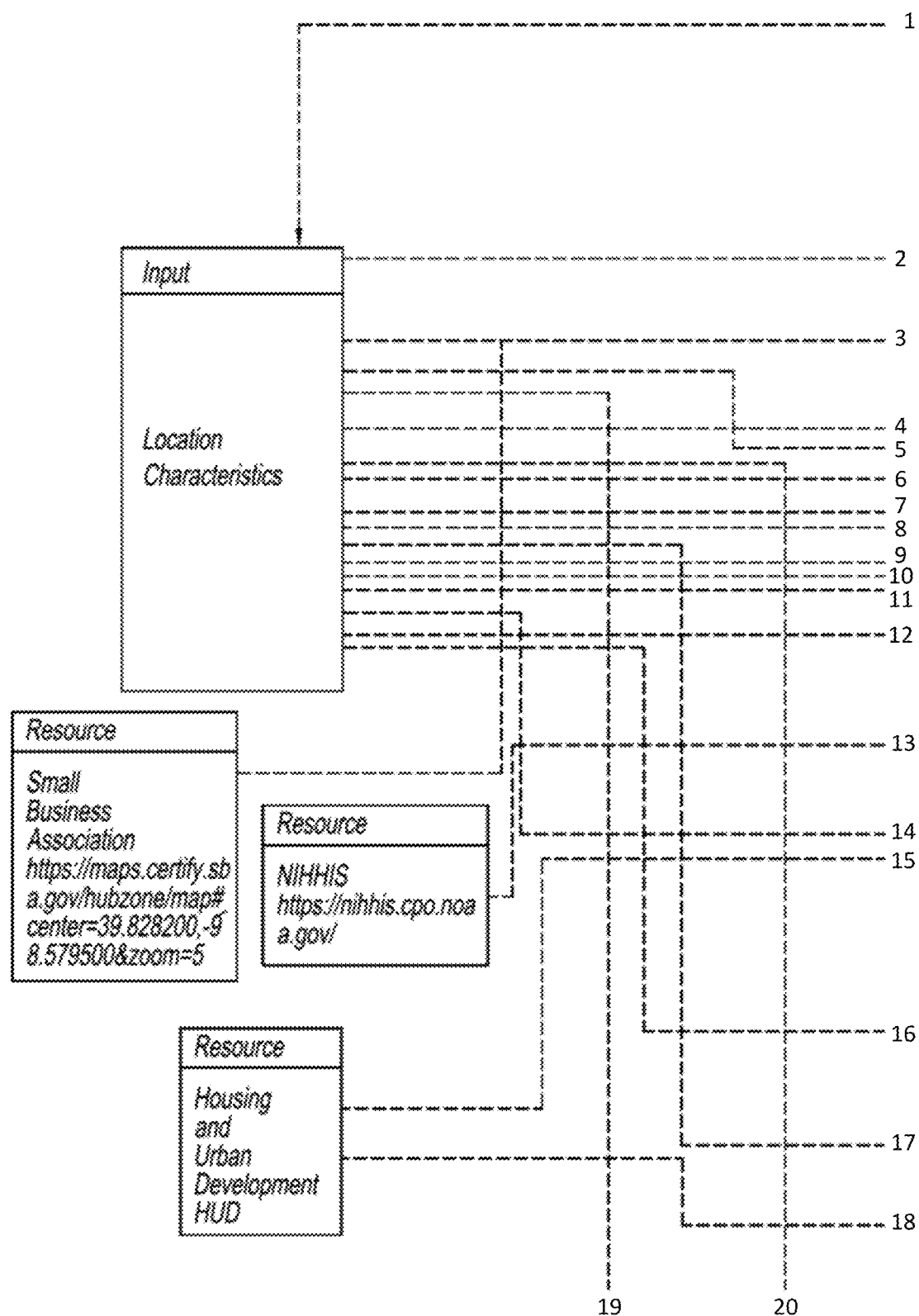
FIG. 2A is a first section of a detailed datagraph illustrating data flow(s) for the SERECDG.
Figure 2B:
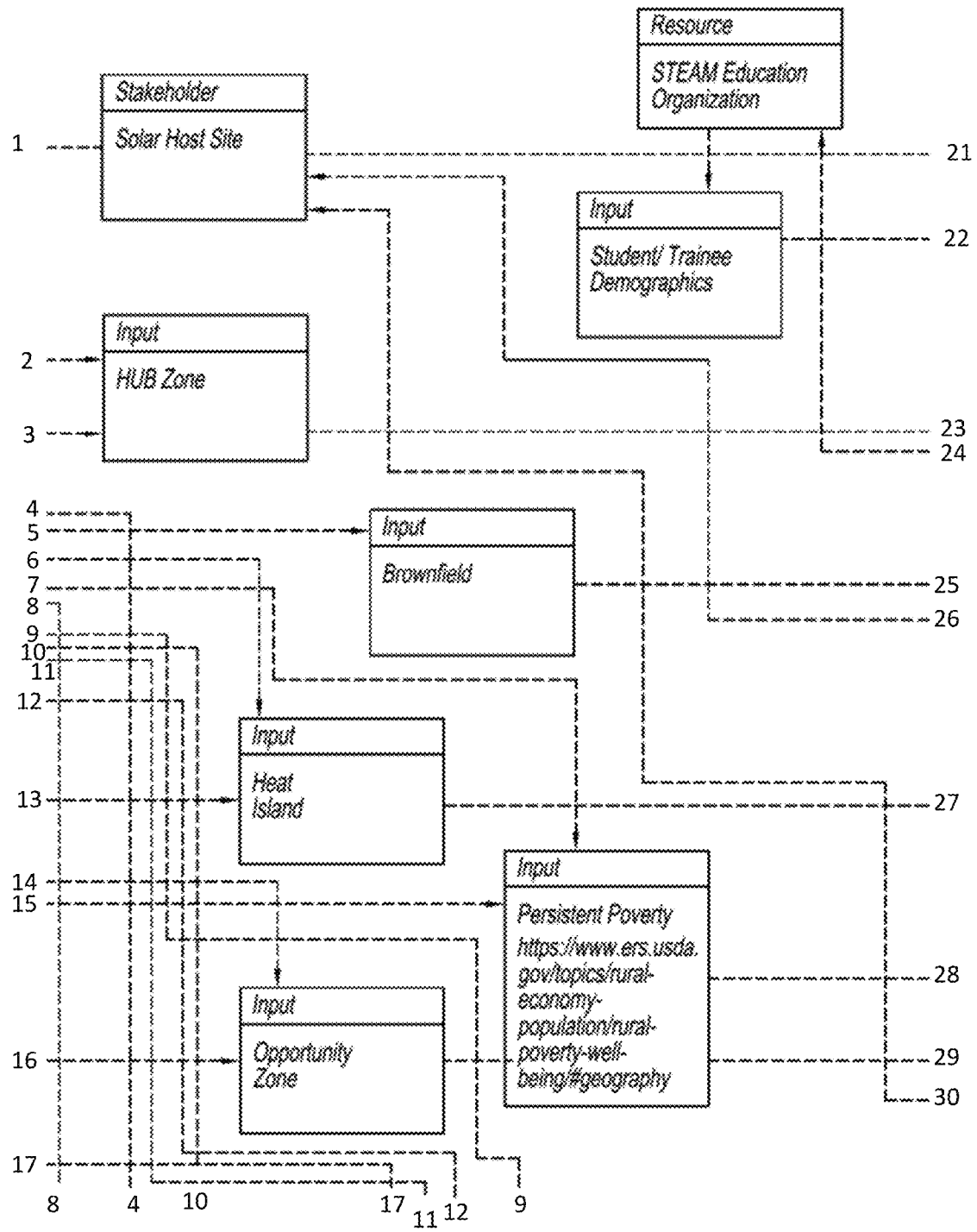
FIG. 2B is a second section of a detailed datagraph illustrating data flow(s) for the SERECDG.
Figure 2C:
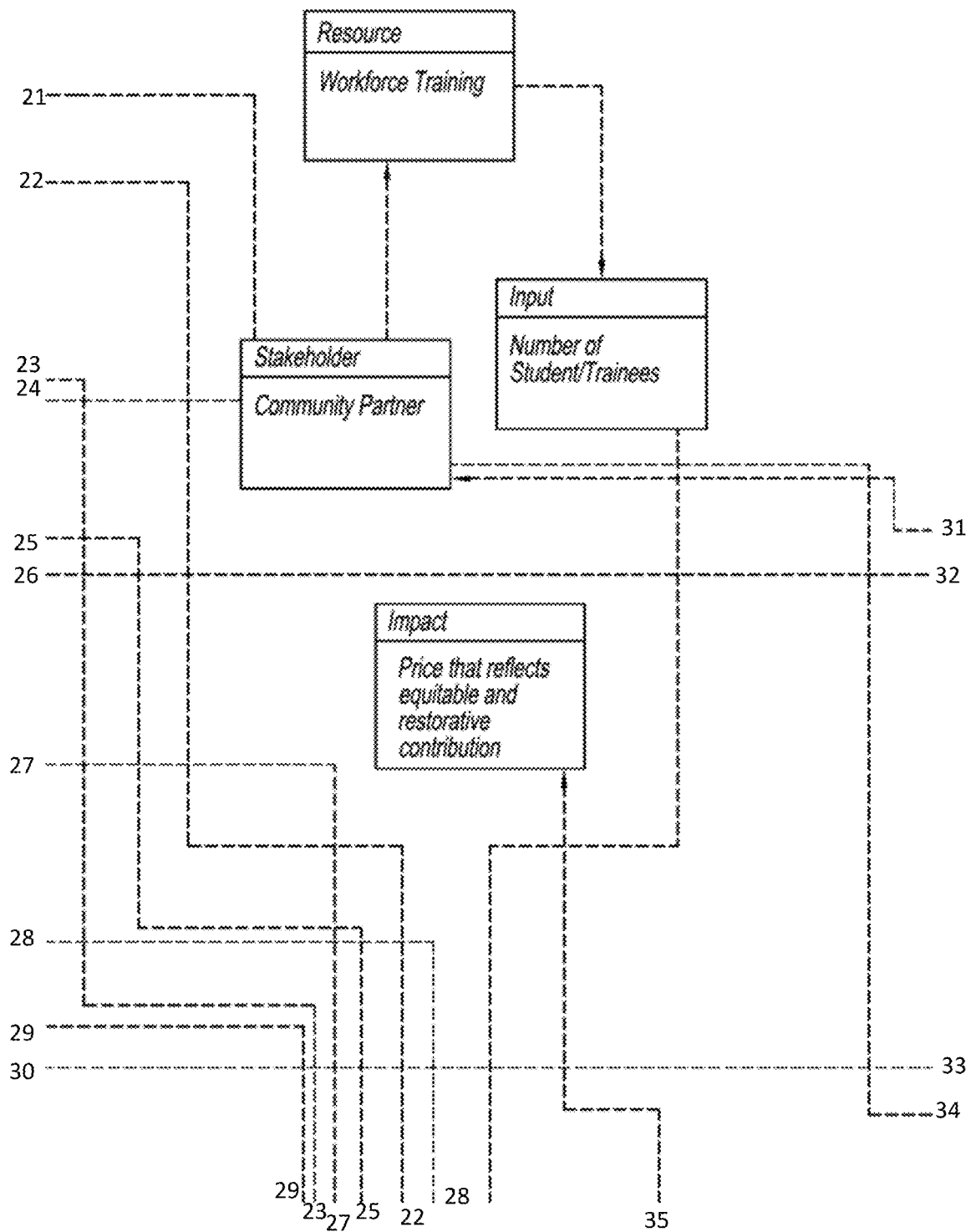
FIG. 2C is a third section of a detailed datagraph illustrating data flow(s) for the SERECDG.
Figure 2D:
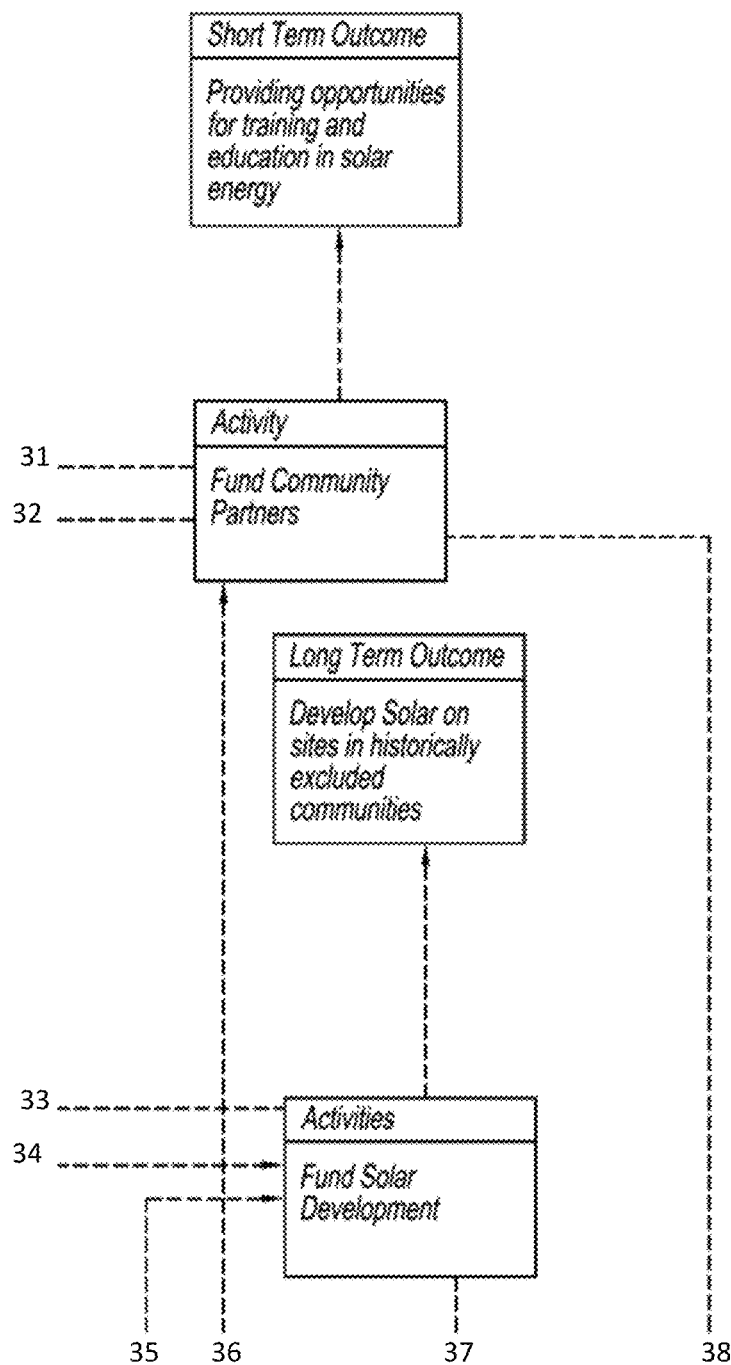
FIG. 2D is a fourth section of a detailed datagraph illustrating data flow(s) for the SERECDG.
Figure 2E:
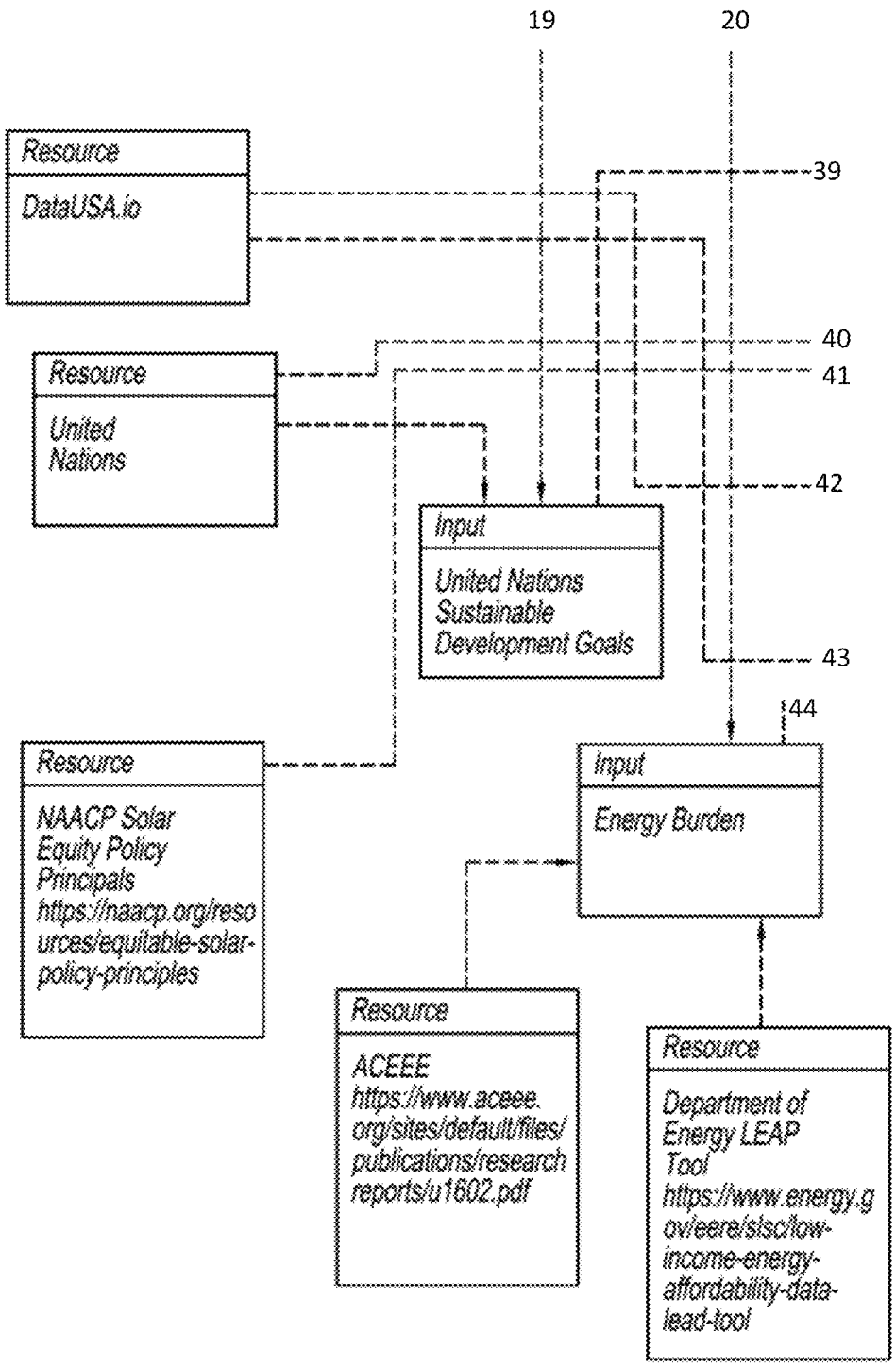
FIG. 2E is a fifth section of a detailed datagraph illustrating data flow(s) for the SERECDG.
Figure 2F:
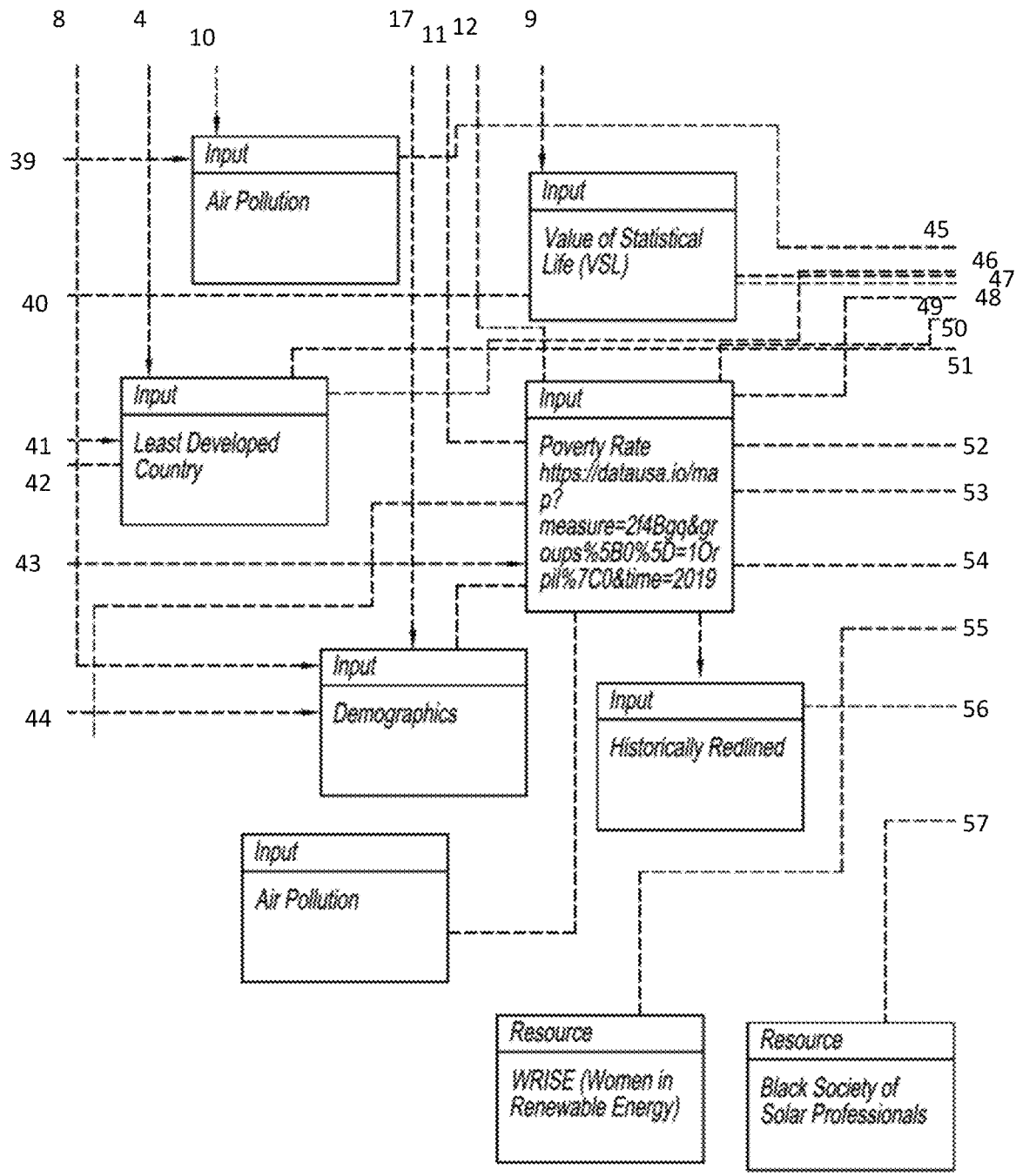
FIG. 2F is a sixth section of a detailed datagraph illustrating data flow(s) for the SERECDG.
Figure 2G:
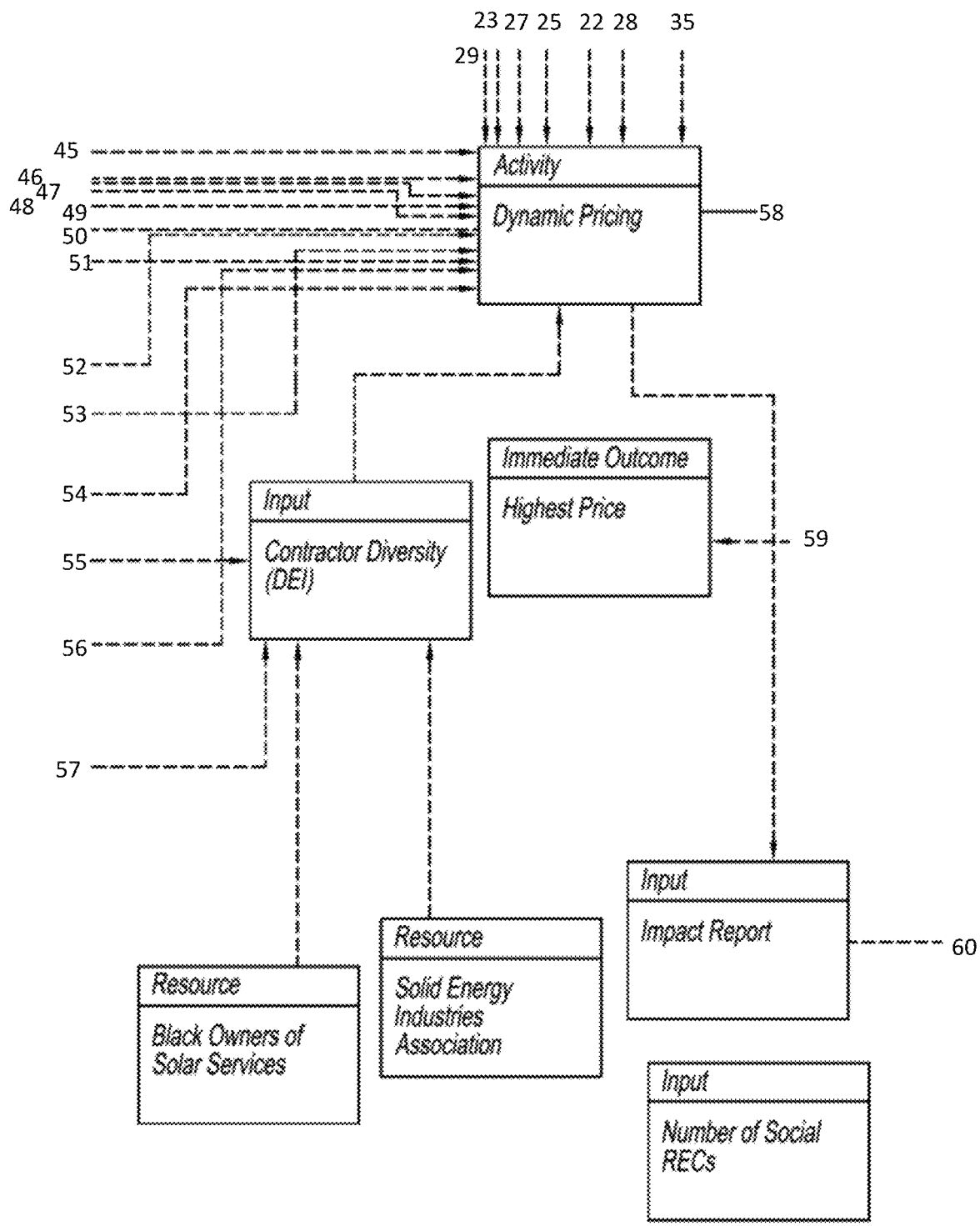
FIG. 2G is a seventh section of a detailed datagraph illustrating data flow(s) for the SERECDG.
Figure 2H:
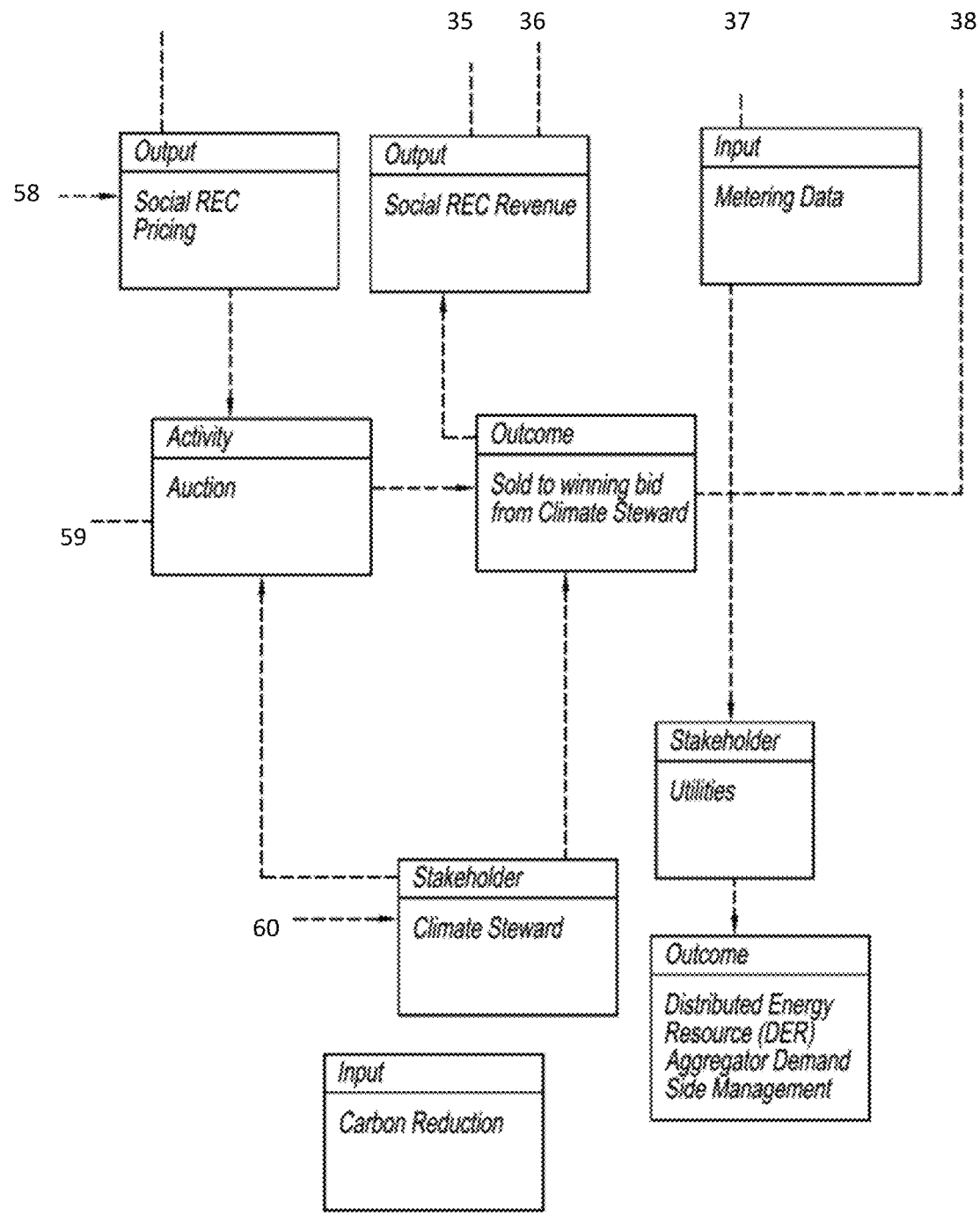
FIG. 2H is an eight section of a detailed datagraph illustrating data flow(s) for the SERECDG.

FIG. 1 shows a datagraph illustrating data flow(s) for the SERECDG. The data flow includes exchanges between climate stewards, community stewardship, solar hosts, and solar investors. The exchanges are described below.

FIGS. 2A, 2B, 2C, 2D, 2E, 2F, 2G, and 2H each depict a respective section of a detailed datagraph illustrating data flow(s) for the SERECDG. The connections between each figure is labelled with a number assigned to the line that carries over the next figure. The dataflow(s) are described in greater detail below.

Markets

Climate change is upending lives across the globe. Although the repercussions vary, from floods in some regions and droughts in others, the impacts of a warming planet are felt by all. While still tragic, those with resources can rebuild, relocate, and recover. This is not the case among the world's most vulnerable populations. Whether disenfranchised by poverty, gender, race, or culture, climate change disproportionally effects those who cannot simply move out of the way.

Policies like renewable portfolio standards have greatly aided in the facilitation of renewable energy projects providing a lifeline for developers and consultants. However, when connecting the value of these policies and technology to the every-day person, particularly the disenfranchised, a chasm still exists. Renewable energy credits remain a mystery to most consumers making grass roots advocacy for supportive policies challenging. Even still, attempting to address this issue by explaining the complex nature of this important development resource is another difficult task all together.

It has been proven that nothing sells solar like more solar. Communities need to see and experience the benefits of renewable technologies for themselves. Much more powerful than a webinar or a lecture, directly connecting communities with the benefits of renewable energy credits sourced from on-site solar clearly demonstrates to them the value of renewable portfolio standards, of renewable energy credits, and of carbon reduction investments. Sourcing renewable energy credits from impact sites such as schools, affordable housing developments, senior housing, and non-profits multiplies the impact and directly connects more everyday people with the value of renewable energy.

The SERECDG provides ways in which large scale renewable energy buyers can most efficiently procure renewable energy credits to directly benefit and positively impact those most vulnerable to climate change.

In one embodiment, the SERECDG includes an energy attribute that increases equity in renewable energy development is disclosed. Social/Equity/Impact Renewable Energy Credits are a unique energy attribute product produced by the generation of renewable energy serves the public good and incorporates multiple value propositions such as community impact and marketing value.

As such, the SERECDG solves a number of problems. For example, making renewable energy economically viable is a challenge for a wide variety of stakeholders. Small projects lack the scale to attract financing. Policy restrictions on renewable energy in many markets prohibit achieving significant scale. Energy rates in several markets make it difficult for projects to produce an attractive return on investment without an additional revenue stream. Corporations are purchasing renewable energy credits (RECs), yet RECs lack tangible, and marketable impact. The most adversely effected by these market limitations are those consumers at the low end of the socioeconomic scale.

The market for energy attributes is often focused on larger scale renewable developments and does not include direct social and/or community impact.

Social/Equity/Impact Renewable Energy Credits are a unique energy attribute product produced by the generation of renewable energy serves the public good and incorporates multiple value propositions such as community impact and marketing value.

Distribution Generation

Making on-site, or distributed generation (DG) solar economically viable is a challenge for a wide variety of stakeholders. Small projects lack the scale to attract financing. Policy restrictions on renewable energy in many markets prohibit achieving significant scale. Energy rates in several markets make it difficult for projects to produce an attractive return on investment without an additional revenue stream. Corporations are purchasing renewable energy credits (RECs), yet not from DG solar arrays. RECs lack tangible, and marketable impact when purchased traditionally from utility-scale renewable energy. The most adversely effected by these market limitations are consumers those at the low end of the socioeconomic scale.

Social or Equity Renewable Energy Credits create an additional revenue stream to aid in the development of on-site solar. This unique energy attribute product is procured from on-site solar arrays, and is priced to reflect societal AND environmental impact. This market innovation also helps corporations to create more tangible and marketable value when procuring energy attributes as part of their overall carbon reduction AND community impact strategy.

Social/Equity Renewable Energy Credits (RECs) are a new energy attribute product that allows for 1) more revenue for solar projects, 2) more tangible, marketable community impact for buyers of energy attributes, and 3) more access to solar for those traditionally without choice or access.

Renewable Energy Credits have been procured only from large utility scale renewables and include no appropriate provisions for community impact or the different economics of on-site solar development.

Social or Equity Renewable Energy Credits are a unique energy attribute product produced by the generation of renewable energy from on-site, or distributed generation (DG), renewable energy sources. Our unique process to produce a Social/Equity REC vets the DG sites, provides the adequate scale, facilitates the procurement, and often times provides the financing component for the renewable technology. This unique process produces the market innovation that is a Social/Equity Renewable Energy Credit.

1) Recruit and vet on-site renewables, or distributed generation (DG) sites for inclusion in Social/Equity REC portfolio.
2) Provide tax equity, and various third-party financing resources for the development of DG renewables.
3) Aggregate sites into a scaleable portfolio with qualitative societal impact, energy production metrics, and subsequent pricing for Social/Equity REC end purchaser.
4) Work with various energy attribute purchasers to include Social/Equity RECs within their carbon reduction portfolio and execute Social/Equity REC off-taker agreements.
5) Use revenue from Social/Equity RECs to develop DG projects typically impeded from development without this additional revenue stream.
6) Work with third parties to provide marketing and PR functions, workforce training and STEAM resources as part of the Solar Stewards Program and Social/Equity REC product.
7) Perform operations and maintenance for the DG renewable application to remain in compliance with all Social/Equity REC off-taker agreements and Power Purchase Agreements (PPAs.) for the term of the contracts.
8) Continue to monitor and quantify community and well as environmental impact both internally for the Solar Stewards Program and for external stakeholders.
1) Without vetted DG sites there are no opportunities for on-site generation to produce the MW/hrs (megawatt hours) needed to produce a Social/Equity REC.
2) Without a financing component (ie: tax equity and impact investment) these DG sites do not have the financial resources to be developed.
3) These DG sites alone cannot produce the scale needed for a typical REC buyer or the financier in step 2, and thus an aggregated portfolio of multiple sites is needed.
4) As the social/equity REC is a unique product, separate from anything currently on the market, special relationships and qualitative data is needed for the pricing, marketing, and sale of these energy attributes.
5) The sale of the social/equity RECs provides the additional revenue to make the DG energy project economically viable for all stakeholders including the DG host site, the financiers, and the social/equity REC purchaser.
6) To deliver on the community impact ethos of social/equity RECs, the Solar Stewards Program facilitates additional community impact programs central to the DG energy project.
7) Operations and maintenance of the DG project is imperative in honoring social/equity REC off-taker agreements and power purchase agreements.
8) Monitoring and qualifying the community and environmental impacts is important to furthering the adoption of both environmental AND community impact inherent in the Social/Equity Renewable Energy Credit product.

If enough distributed generation (DG) host sites are vetted and obtained, enough scale to be considered for tax equity/impact investment and financing can be reached.

When at scale, enough on-site energy to be attractive to a Renewable Energy Credit off-taker can be generated.

If the community impact of the DG project is quantified, the Social/Equity REC can be priced accordingly to make the project economically viable where it typically may not otherwise be for all stakeholders. This specifically mechanism generating a market rate IRR (internal rate of return) for the investors and a beneficial PPA (power purchase agreement) rate for the DG host site as well as sufficient proceeds for development and legal costs.

The Solar Stewards Program facilitates all aspects of this interlinked value chain to bring the unique Social/Equity REC product to market, which in turn creates a competitive advantage in the development of DG renewable projects.

Social/Equity Renewable Energy Credits (RECS) allow for more community impact via on-site, or distributed generation (DG) renewables by providing an additional income stream to make small scale DG projects economically viable. Through the Solar Stewards Program process, a large portfolio of DG sites is obtained and vetted to reach enough scale for third-party financing, as well as create enough volume for the typical energy attribute purchaser/offtaker. Because of the direct impact of providing on-site or DG renewables to these host sites and with our qualitative impact metrics, a price for our Social/Equity RECs can be set that generates enough internal rate of return (IRR) to satisfy our third-party financiers and delivers a Power Purchase Agreement (PPA) that offers the DG host site significant savings on their electric utility bill. Social/Equity RECs also provide for the development and legal costs associated with the complexity of DG solar development across an aggregated portfolio. To fulfill the Social/Equity Impact inherent in a Social/Equity Renewable Energy Credit, the Solar Stewards Program also facilitates various workforce development, advocacy, and STEAM programs utilizing the on-site renewable technology.

1) Locate and vet credit worthy sites in states that allow for third party renewable energy financing until scale is reached, typically over 1 MW (megawatt). This could look like 20 individual schools, or 10 affordable housing buildings, for example. Vetting includes doing all pre development work from obtaining utility bills, to sizing DG systems, obtaining pricing, specking equipment and getting the DG host site ready to enter into a PPA (power purchase agreement).

2) Locate and vet financiers, impact investors, tax equity investors, willing to finance a portfolio of distributed generation host sites at a competitive rate and with flexible terms. This could be the standard 20 yr PPA, although usually less to coincide with the much shorter term of most REC off-taker agreements.

3) Obtain impact metrics, including DG site user demographics, income levels and other intrinsic values used to determine the pricing for the "Social/Equity REC product.

4) Locate the appropriate energy attribute buyer for Social/Equity RECs though key relationships and market and sell them on the best price/term for all stakeholders in the Solar Stewards Program. These general stakeholders include: 1) The DG host site where the renewables are located. 2) The community that uses the DG host site 3) The financier providing capital to deploy the DG assets are located 4) The Solar Stewards Program development costs which include legal and EPC costs (engineering, procurement, and construction, aka a solar installer).

5) Execute all Off-taker and PPA agreements and manage the development of the DG project portfolio.

6) Monitor all operations and maintenance and bill the DG Solar host sites to ensure they are in compliance with the Social/Equity REC offtaker agreement, the PPA for the term of all agreements.

7) Deliver on the additional impact inherent in the Social/Equity REC product via the Solar Stewards Program by facilitating community impact programs using the DG renewable as a training/learning tool, as well as public relations and advocacy.

One element, the trade secret of the Solar Stewards Program, is the ability to create a unique energy attribute, (what we've named Social or Equity Renewable Energy Credits) that are sourced from distributed generation renewables located on site, create a direct community impact, and command a unique price because of this additional value, where traditional RECs do not. This added value creates the unique pricing that enables the Solar Stewards program to develop more economically viable DG projects. It's a virtuous cycle and a fully integrated process.

Similar claims to the community impact and subsequent value of RECs generated from DG sources could enter the market, however without the vertically integrated Solar Stewards Program Process that ensures legitimacy and tangible impact throughout the value chain, there is the potential for misuse and "greenwashing" of the Social/Equity REC product.

On-site renewable developers can engage the Solar Stewards Program to realize additional project revenue from the sale of our Social/Equity renewable energy credits.

DG Host Sites can realize a reduction in their utility spend by entering into a Solar Stewards Power Purchase Agreement.

Our Social/Equity REC purchasers/offtakers realize both an environmental goal in the form of carbon reduction, as well as community impact and marketing/PR opportunities associated with tangible, on-site renewables.

Tax Equity investors get all affiliated tax credits with the array, impact investors receive a competitive return.

Residents of the community in which the DG site is based are provided with workforce development resources, STEAM learning tools etc.

The Social/Equity Renewable Energy Credit Product can also be utilized within a blockchain framework that will allow for a streamlining/automation of the authentication of the Social/Equity REC product. As blockchain advances in this application, it will make off-grid and international DG sites eligible for purchase. This added revenue will facilitate the development of more DG renewables, i.e.: Solar Stewards process.

The Solar Stewards Program creates the opportunity for the scaling, and financing of DG renewables combined with community impact to yield a unique social impact product in the energy attribute space. The same could be applied to Carbon Offsets and other future energy attribute frameworks. Energy attributes typically indicate one megawatt-hour of electricity was generated and fed into the grid from an eligible renewable source.

An Energy Attribute that Increases Equity in Renewable Energy Development

Making renewable energy economically viable is a challenge for a wide variety of stakeholders. Small projects lack the scale to attract financing. Policy restrictions on renewable energy in many markets prohibit achieving significant scale. Energy rates in several markets make it difficult for projects to produce an attractive return on investment without an additional revenue stream. Corporations are purchasing renewable energy credits (RECs), yet RECs lack tangible, and marketable impact. The most adversely effected by these market limitations are consumers those at the low end of the socioeconomic scale.

Social/Equity/Impact Renewable Energy Credits create an additional revenue stream to aid in the more equitable development of renewable energy. This unique energy attribute product is procured from sites serving the public good, and is priced to reflect multiple value propositions including marketing, societal, and environmental value. Our product helps market players create more tangible and marketable value when procuring energy attributes to accomplish multiple goals including carbon reduction, community engagement, marketing and Environmental, Social, and Governance goals.

Social/Equity/Impact Renewable Energy Credits (RECs) are a new energy attribute product that allows for 1) better economics for renewable projects serving the public good 2) More tangible, visible marketing value for buyers of energy attributes. 4) More opportunities for community impact for all stakeholders 3) More access to clean energy for those traditionally without choice or access.

Renewable Energy Credits are currently and historically procured only from large utility scale renewables and include no appropriate provisions for community impact or the different economics of on-site solar development.

The market for energy attributes is typically focused on larger scale renewable developments and does not include direct social and/or community impact.

Traditional energy attributes do not account for the equitable development of renewable assets.

Social/Equity/Impact Renewable Energy Credits are a unique energy attribute product produced by the generation of renewable energy serves the public good and incorporates multiple value propositions such as community impact and marketing value.

Our unique process to produce a Social/Equity REC vets the DG sites, provides the adequate scale, facilitates the procurement, and often times provides the financing component for the renewable technology. This unique process produces the market innovation that is a Social/Equity Renewable Energy Credit.

1) Recruit and vet renewable development sites serving the public good.
2) Evaluate project economics, and Environmental, Social, and Governance metrics, marketing value, and qualitative and quantitative data.
3) Aggregate sites into a scalable portfolio with data to yield appropriate pricing for all stakeholders, including off-takers.
4) Work with various energy attribute purchasers to include Social/Equity/Impact RECs within their carbon reduction portfolio, marketing and PR strategy, and Environmental, Social, and Governance goals. Execute off-taker agreements.
5) Use revenue from Social/Equity/Impact RECs to develop and sustain renewable projects typically impeded from development without this additional revenue stream.
6) Coordinate marketing and PR functions, and community and stakeholder engagement and impact.

The recruitment and qualifying of applicable renewable generation sources is key to determining the eligibility of a Social/Equity/Impact REC and obtaining the scale to attract buyers. (elements 1-4) The revenue generated by Social/Equity/Impact RECs is factored into project economics to help development. (step 5) The application and marketing of the product and benefits is part of the value to the off-taker. (step 6)

1) Without vetted DG sites there are no opportunities for on-site generation to produce the MW/hrs (megawatt hours) needed to produce a Social/Equity REC.
2) Without a financing component (i.e.: tax equity and impact investment) these DG sites do not have the financial resources to be developed.
3) These DG sites alone cannot produce the scale needed for a typical REC buyer or the financier in step 2, and thus an aggregated portfolio of multiple sites is needed.
4) As the social/equity REC is a unique product, separate from anything currently on the market, special relationships and qualitative data is needed for the pricing, marketing, and sale of these energy attributes.
5) The sale of the social/equity RECs provides the additional revenue to make the DG energy project economically viable for all stakeholders including the DG host site, the financiers, and the social/equity REC purchaser.
6) To deliver on the community impact ethos of social/equity RECs, the Solar Stewards Program facilitates additional community impact programs central to the DG energy project.
7) Operations and maintenance of the DG project is imperative in honoring social/equity REC off-taker agreements and power purchase agreements.
8) Monitoring and qualifying the community and environmental impacts is important to furthering the adoption of both environmental AND community impact inherent in the Social/Equity Renewable Energy Credit product.

By following the above listed elements, a unique energy attribute is created which lends more equity to renewable energy development.

The mechanism disclosed herein includes of the above listed elements.

This specifically mechanism generating a market rate IRR (internal rate of return) for the investors and a beneficial PPA (power purchase agreement) rate for the DG host site as well as sufficient proceeds for development and legal costs.

The Solar Stewards Program facilitates all aspects of this interlinked value chain to bring the unique Social/Equity REC product to market, which in turn creates a competitive advantage in the development of DG renewable projects.

Social/Equity Renewable Energy Credits (RECS) allow for more equitable renewable energy development by providing an additional income stream to make renewable energy applications benefiting the public good economically viable to all stakeholders.

Through the Solar Stewards Program, we obtain, and vet a large portfolio of DG sites to reach enough scale for third-party financing, as well as create enough volume for the typical energy attribute purchaser/offtaker. Because of the direct impact of providing on-site or DG renewables to these host sites and with our qualitative impact metrics, we can command a price for our Social/Equity RECs that generates enough internal rate of return (IRR) to satisfy our third-party financiers and delivers a Power Purchase Agreement (PPA) that offers the DG host site significant savings on their electric utility bill. Social/Equity RECs also provide for the development and legal costs associated with the complexity of DG solar development across an aggregated portfolio. To fulfill the Social/Equity Impact inherent in a Social/Equity Renewable Energy Credit, the Solar Stewards Program also facilitates various workforce development, advocacy, and STEAM programs utilizing the on-site renewable technology.

1) Locate and vet credit worthy sites in states that allow for third party renewable energy financing until scale is reached, typically over 1 MW (megawatt). This could look like 20 individual schools, or 10 affordable housing buildings, for example. Vetting includes doing all pre development work from obtaining utility bills, to sizing DG systems, obtaining pricing, specking equipment and getting the DG host site ready to enter into a PPA. (power purchase agreement).
2) Locate and vet financiers, impact investors, tax equity investors, willing to finance a portfolio of distributed generation host sites at a competitive rate and with flexible terms. This could be the standard 20 yr PPA, although usually less to coincide with the much shorter term of most REC off-taker agreements.
3) Obtain impact metrics, including DG site user demographics, income levels and other intrinsic values used to determine the pricing for the "Social/Equity REC product.
4) Locate the appropriate energy attribute buyer for Social/Equity RECs though key relationships and market and sell them on the best price/term for all stakeholders in the Solar Stewards Program. These general stakeholders include: 1) The DG host site where the renewables are located. 2) The community that uses the DG host site 3) The financier providing capital to deploy the DG assets are located 4) The Solar Stewards Program development costs which include legal and EPC costs (engineering, procurement, and construction, aka a solar installer).
5) Execute all Off-taker and PPA agreements and manage the development of the DG project portfolio.
6) Monitor all operations and maintenance and bill the DG Solar host sites to ensure they are in compliance with the Social/Equity REC offtaker agreement, the PPA for the term of all agreements.
7) Deliver on the additional impact inherent in the Social/Equity REC product via the Solar Stewards Program by facilitating community impact programs using the DG renewable as a training/learning tool, as well as public relations and advocacy.

One element, is the ability to create a unique energy attribute, (entitled Social/Equity/Impact Renewable Energy Credits) from renewable energy generation that serves the public good, and price this product to include all value propositions as described for the benefit of all stakeholders.

that are sourced from distributed generation renewables located on site, create a direct community impact, and command a unique price because of this additional value, where traditional RECs do not. This added value creates the unique pricing that enables the Solar Stewards program to develop more economically viable DG projects. It's a virtuous cycle and a fully integrated process.

Similar claims to the community impact and subsequent value of RECs generated from renewable sources located near, on, or serving the public good could enter the market, however without elements mentioned herein to ensure legitimacy and tangible impact throughout the value chain that constitutes the Social/Equity/Impact REC product, there is the potential for misuse and "greenwashing."

Renewable energy developers can utilize Social/Equity/Impact renewable energy credits to realize additional project revenue on projects serving the public good.

Renewable energy producers can realize a new revenue stream and/or benefit from better project economics and savings on energy expenditures.

Our Social/Equity/Impact REC purchasers/off-takers realize both an environmental goal in the form of carbon reduction, as well as community impact and marketing/PR opportunities.

Tax Equity investors get all affiliated tax credits with the array, impact investors receive a competitive return.

Residents of the community in which the DG site is based are provided with workforce development resources, STEAM learning tools etc.

The Social/Equity/Impact Renewable Energy Credit Product can also be utilized within a blockchain framework that will allow for a streamlining/automation of the authentication of the Social/Equity/Impact REC product.

The inclusion of both qualitative and quantitative data to price an attribute to include and produce more equitable outcomes can apply to data, machine learning, water and mineral rights, and all sustainability measures.

The Social/Equity/Impact Renewable Energy Credit Product can also be utilized within a blockchain framework that will allow for a streamlining/automation of the authentication of the Social/Equity/Impact REC product. As blockchain advances in this application, it will make off-grid and international DG sites eligible for purchase. This added revenue will facilitate the development of more DG renewables, i.e.: Solar Stewards process.

The Solar Stewards Program creates the opportunity for the scaling, and financing of DG renewables combined with community impact to yield a unique social impact product in the energy attribute space. The same could be applied to Carbon Offsets and other future energy attribute frameworks. Energy attributes typically indicate one megawatt-hour of electricity was generated and fed into the grid from an eligible renewable source.

Social Equity Impact Renewable Energy

As stated above, making renewable energy economically viable is a challenge for a wide variety of stakeholders. Small projects lack the scale to attract financing. Policy restrictions on renewable energy in many markets prohibit achieving significant scale. Energy rates in several markets make it difficult for projects to produce an attractive return on investment without an additional revenue stream. Corporations are purchasing renewable energy credits (RECs), yet RECs lack tangible, and marketable impact. The most adversely effected by these market limitations are those consumers at the low end of the socioeconomic scale. The invention claimed here solves this problem.

Social/Equity/Impact Renewable Energy Credits create an additional revenue stream to aid in the more equitable development of renewable energy. This unique energy attribute product is procured from sites serving the public good, and is priced to reflect multiple value propositions including marketing, societal, and environmental value. Our product helps market players create more tangible and marketable value when procuring energy attributes to accomplish multiple goals including carbon reduction, community engagement, marketing and Environmental, Social, and Governance goals.

The claimed invention differs from what currently exists. Social/Equity/Impact Renewable Energy Credits (RECs) are a new energy attribute product that allows for 1) better economics for renewable projects serving the public good 2) More tangible, visible marketing value for buyers of energy attributes. 4) More opportunities for community impact for all stakeholders 3) More access to clean energy for those traditionally without choice or access.

This invention is an improvement on what currently exists. Social/Equity/Impact Renewable Energy Credits (RECs) are a new energy attribute product that allows for 1) better economics for renewable projects serving the public good 2) More tangible, visible marketing value for buyers of energy attributes. 4) More opportunities for community impact for all stakeholders 3) More access to clean energy for those traditionally without choice or access.

Traditional energy attributes do not account for the equitable development of renewable assets.

Social/Equity/Impact Renewable Energy Credits are a unique energy attribute product produced by the generation of renewable energy serves the public good and incorporates multiple value propositions such as community impact and marketing value.

The SERECDG can produce data sets.

In one embodiment the SERECDG includes the following process elements:

1) Recruit and vet renewable development sites serving the public good
2) Evaluate project economics, and Environmental, Social, and Governance metrics, marketing value, and qualitative and quantitative data.
3) Aggregate sites into a scalable portfolio with data to yield appropriate pricing for all stakeholders, including off-takers.
4) Work with various energy attribute purchasers to include Social/Equity/Impact RECs within their carbon reduction portfolio, marketing and PR strategy, and Environmental, Social, and Governance goals. Execute off-taker agreements.
5) Use revenue from Social/Equity/Impact RECs to develop and sustain renewable projects typically impeded from development without this additional revenue stream
6) Coordinate marketing and public relations functions, and community and stakeholder engagement and impact.

In One Embodiment the Relationship Between the Components Includes:

The recruitment and qualifying of applicable renewable generation sources are key to determining the eligibility of a Social/Equity/Impact REC and obtaining the scale to attract buyers. (elements 1-4) The revenue generated by Social/Equity/Impact RECs is factored into project economics to help development. (step 5) The application and marketing of the product and benefits is part of the value to the off-taker. (step 6)

Instantiating the SERECDG:

By following the above listed process elements, a unique energy attribute is created which lends more equity to renewable energy development.

If we vet and obtain enough renewable generation directly serving the public good than this aggregate is more attractive for funding and a Social/Equity/Impact Renewable Energy Credit off-taker. If we can include the additional values of community impact, marketing, and visibility of the renewable energy source, Social/Equity/Impact RECs can be priced to make the project economically viable where it typically may not otherwise be for all stakeholders.

Example Implementations of the SERECDG:

The mechanism disclosed herein includes of the above-listed elements

One element, is the ability to create a unique energy attribute, (entitled Social/Equity/Impact Renewable Energy Credits) from renewable energy generation that serves the public good, and price this product to include all value propositions as described for the benefit of all stakeholders.

Similar claims to the community impact and subsequent value of RECs generated from renewable sources located near, on, or serving the public good could enter the market, however without elements mentioned herein to ensure legitimacy and tangible impact throughout the value chain and for all stakeholders, there is the potential for misuse and "greenwashing" of the Similar claims to the community impact and subsequent value of RECs generated from renewable sources located near, on, or serving the public good could enter the market, however without elements mentioned herein to ensure legitimacy and tangible impact throughout the value chain that constitutes the Social/Equity/Impact REC product, there is the potential for misuse and "greenwashing."

Employing the SERECDG:

Renewable energy developers can utilize Social/Equity/Impact renewable energy credits to realize additional project revenue on projects serving the public good.

Renewable energy producers can realize a new revenue stream and/or benefit from better project economics and savings on energy expenditures.

Our Social/Equity/Impact REC purchasers/off-takers realize both an environmental goal in the form of carbon reduction, as well as community impact and marketing/PR opportunities.

Additionally: The Social/Equity/Impact Renewable Energy Credit Product can also be utilized within a blockchain framework that will allow for a streamlining/automation of the authentication of the Social/Equity/Impact REC product.

The inclusion of both qualitative and quantitative data to price an attribute to include and produce more equitable outcomes can apply to data, machine learning, water and mineral rights, and all sustainability measures.

Also, the SERECDG: data sets.

In one embodiment, the SERECDG provides framework for the mathematical elements.

A multiple regression model is the proposed model for predicting the value of a renewable energy credit. The value of an energy credit can be predicted by a set of independent variables, which will be determined based on their predictive power in the model. The multiple regression model will be the basis for generating an estimated multiple regression equation of the following form:

$$y = b_0 + b_1 x_1 + b_2 x_2 + \ldots + b_n x_n$$

where y is the predicted value of a renewable credit, $x_1, x_2, \ldots, x_n$ are the chosen set of independent variables, and $b_0, b_1, \ldots, b_n$ are the set of linear coefficients from the analysis.

The data set used to create the model must meet the following requirements:

Linearity between the dependent and each chosen independent variable,

No multicollinearity between independent variables,

Independence (zero correlation) between residuals for time series data,

Homoscedasticity—constant variance of residuals, and

Normal distribution of residuals.

Given that the assumptions are met, the estimated multiple regression equation will predict the value of a renewable energy credit within an confidence interval for values of the independent variables that fall within the range of the data used to create the model. The predictive power of the model will diminish as input variable values diverge from their respective ranges found in the data set.

The validity of the model will be assessed using new data points for renewable energy credits where the actual value can be compared to the predicted value. Error analysis for the new data points will inform updates to the model to reduce errors and bias.

In one embodiment, the SERECDG may provide and fund the collaborative efforts of the SMEs to create the equity formula used to inform Social REC pricing.

SERECDG has been self-funded since inception in 2015. Although a bootstrap model is limited, particularly in a scale-up phase, we have had immense success with extremely limited resources.

Equity Formula

In one embodiment, the SERECDG assess existing equity and energy metrics, and establish parameters and frameworks to inform a formula that can standardize the inclusion a value derived from social attributes. This phase informs the process with real world data.

Equity Formula Parameters Include

Obtain data sets and develop frameworks
Energy Burden
Brownfield data
Demographics
Grid mix
Others
Collaboration on applications and values
Begin inputs into multiple regression models
Focus group with market participants
Potential Social REC buyers/climate stewards
PPA provider/Impact investor
Solar Host Sites Apply regional market data obtained from feasibility phase Project Development Project Feasibility The project feasibility established the scope and goals for the project to set it up for long term success. SERECDG determined the project's feasibility by collecting necessary data to determine what opportunities the client and project can pursue moving forward. This analysis also informs the cost of the Social RECs, and the PPA pricing.

In this element, a site evaluation is conducted to calculate energy information:
  Energy analysis
  Site Selection
  Shade Analysis
  System Sizing
  Applicable rebates and tax incentives With the completed site analysis, Go/No Go decisions will be conducted to establish if and where the solar can be installed, the appropriate project sizing, and total project costs. With this data, SERECDG will evaluate how many MWhs will be available for purchase, the future Renewable Energy Credit's social value from the project impact, and identifying Climate Stewards or social REC buyers.

Identify Project Teams and Stakeholders

Identifying stakeholders and team members is important to the successful development of the project and ensuring the project is developed with community input. Stakeholders and team members will include community leaders and members, the utility company representatives, appropriate government personnel, and engineering, procurement, construction (EPC) firm.

To select the best EPC firm, SERECDG will obtain multiple bids, and if applicable, generate a formal request for proposal RFP to ensure the project is getting the best deal that is tailored to its specific needs and interests. This step will also obtain necessary permits and approvals, and establish the project design.

Solidify Funding

SERECDG will organize, decide upon, and complete these logistical tasks so that the physical solar installation is as seamless, cost-effective, and sustainable as possible. Our impact investment PPA partner will then receive project data in order to arrange for third-party funding. During this funding phase, SERECDG will apply empirical data obtained in this process to inform the development of the social REC formula.

Project Development
  Project Development
  Identify regional pilot site and collect project data
  Assess portfolio of sites, if and where solar can be installed
  Utilize project data to inform Social REC pricing
  Conduct site assessments
  Identify Project Teams and Stakeholders
  Explore potential of solar training workshops
  Establish development teams
  Project design and engineering/Potential RFP Process
  Solidify financing arrangements
  Installer bids and pricing
  Complete and submit PPA/financial applications
  Financing approvals Project Implementation In this phase, construction and interconnection of the solar arrays takes place. SERECDG guides the implementation of a workforce development and onsite training program, so community members can benefit from the construction process. At the end of the construction phase that has been closely and effectively managed, a fully functioning solar system is operating to capitalize and monetize the energy from the sun.

Marketing and media strategies are used throughout the project implementation phase to add value to the Social REC offering, function as a clean energy advocacy and economic development tool, to maximize project exposure, gain funder visibility, and encourage future projects.

Project Implementation
  Award the project to the appropriate EPC
  Workforce development and onsite training
  Construction
  Extra construction time for storage ready applications
  Media and marketing programs Project Monitoring Project monitoring and the sale of social RECs created from the project is the final step in a SERECDG project. The phase is continual, and therefore so are the benefits of the project. In this step, operation and maintenance agreements will be carried out to ensure the solar project is running efficiently and providing maximum energy. As solar energy is produced, the social RECs will be sold through the implemented blockchain technology. At this point, the project will be completing its intended goal of promoting social equity through lifting energy burdens and environmental sustainability.

Project Monitoring and Social REC Sales
  Execute Operations and Maintenance Agreements
  Increase efficiency
  Begin transacting social RECs In one embodiment, the SERECDG may be located in Johnstown, PA and may act as a hub, by thinking global and acting local, the impact of a successful equity metric applied to renewable energy procurement has enormous global implications, with the potential to foster economic development and reduce dependence on fossil fuels on a global scale, making the Alleghenies a leader in global energy innovation once again.

SERECDG is a social enterprise working to include an equity value within Renewable Energy Credit (REC) markets. Adding and attributing an additional value to RECs generated on sites that serve the community will aid in the development of more distributed generation assets in marginalized and low income communities. These specialized solar applications therefore help alleviate climate change, create opportunities for community resilience, serve as a workforce training and advocacy tool, create monetary savings for the community, and foster more equitable outcomes in solar deployment both at a local and global scale.

In one embodiment the SERECDG provides frameworks for the inclusion of the social value to distributed energy resources to then be applied and piloted with local and regional partners within the Allegheny region. The application of our Social RECs™ will reduce energy costs, create workforce training and learning opportunities, and provide opportunities for extra power redundancy for schools, hospitals, affordable housing, municipalities, and other important community serving institutions.

SERECDG seeks to introduce equity into global renewable energy markets with the market innovation of Social Renewable Energy Credits. With Social RECs, we develop solar projects using blockchain and impact capital in low income communities.

Working with national and international REC brokerages, SERECDG identified a unique niche, and began to self-develop 1 MW of solar located in the birthplace of Martin Luther King jr, and the late Civil Rights champion John Lewis's 5th district.

Energy Attributes that Increase Equity in Renewable Energy Development

Making renewable energy economically viable is a challenge for a wide variety of stakeholders. Small projects lack the scale to attract financing. Policy restrictions on renewable energy in many markets prohibit achieving significant scale. Energy rates in several markets make it difficult for projects to produce an attractive return on investment without an additional revenue stream. Corporations are purchasing renewable energy credits (RECs), yet oftentimes RECs lack local, tangible, marketable, community centered and impact. The most adversely affected by these market limitations are consumers and communities who have been historically excluded, including but not limited to communities of color, and low and moderate income communities.

Social/Equity/Impact Renewable Energy Credits create an additional revenue stream to aid in the more equitable development of renewable energy. This unique energy attribute product is procured from sites serving the public good, and is priced to reflect multiple value propositions including marketing, societal, and environmental value. Our product helps market players create more tangible and marketable value when procuring energy attributes to accomplish multiple goals including but not limited to: carbon reduction, community engagement, marketing and public relations, corporate social responsibility, Environmental, Social, and Governance, diversity, equity and inclusion, restorative justice, and stakeholder engagement goals.

Social/Equity/Impact Renewable Energy Credits (RECs) are a new energy attribute product that allows for 1) better economics for renewable projects serving the public good 2) More tangible, visible marketing value for buyers of energy attributes. 4) More opportunities for community impact for all stakeholders 3) More access to clean energy for historically excluded communities, and those traditionally without choice or access.

Renewable Energy Credits are currently and historically procured only from large utility scale renewables and include no appropriate provisions for community impact or the different economics of On-site solar development.

The market for energy attributes is typically focused on larger scale renewable developments and does not include direct social and/or community impact.

Traditional energy attributes do not account for the equitable development of renewable assets.

Social/Equity/Impact Renewable Energy Credits are a unique energy attribute product produced by the generation of renewable energy that serves the public good, directly impacts and enhances value for historically excluded communities, and incorporates multiple value propositions such as community impact and marketing value. Social RECs are especially beneficial to distributed generation renewable energy applications where the On-site, local nature of the renewable power generation can offer enhanced equity opportunities such as enhanced resiliency, workforce training opportunities, experiential learning, and participation in smart-grid and demand-side energy programs.

Our unique stakeholder engagement and procurement process to produce a Social/Equity REC vets renewable energy sites stakeholder and communities for eligibility based on several points of impact data, aggregates project sites to provide provides the adequate scale, facilitates the procurement, and often times provides a important financing component for deployment of the renewable technology. This unique process produces the market innovation that is a Social/Equity Renewable Energy Credit.

1) Recruit and vet renewable development sites serving the public good
2) Evaluate project economics, development teams, community impact data including but not limited to energy burden, historical context, demographics, and Environmental, Social, and Governance metrics, marketing value, and qualitative and quantitative data.
3) Aggregate sites into a scalable portfolio with social and project data to yield appropriate Social REC pricing for all stakeholders, including community groups, development teams, and power off-takers.
4) Work with various energy attribute purchasers to include Social/Equity/Impact RECs within their carbon reduction portfolio, marketing and PR strategy, and Environmental, Social, and Governance goals. Execute off-taker agreements, utilize existing REC registries to buyer specifications.
5) Use revenue from Social/Equity/Impact RECs to TIER One: Develop and sustain renewable projects serving historically excluded communities typically impeded from development without this additional revenue stream TIER TWO: Fund economic inclusion and community resilience activities such as workforce training, STEAM education tools, storage-ready capabilities, energy efficiency and weatherization, TIER THREE: Restorative Justice. Utilize Social REC revenue to reduce energy burden and foster restorative economic development and enhancement for historically excluded communities.

6) Coordinate marketing and PR functions, community and stakeholder engagement and tracking of impact KIPs (Key performance indicators) for community use as well as CSR reporting The recruitment and qualifying of applicable renewable generation sources serving historically excluded communities is key to determining the eligibility of a Social/Equity/Impact REC and obtaining the scale to attract buyers. (steps 1-4) The revenue generated by Social/Equity/Impact RECs is factored into project economics to help development, and economic empowerment. (step 5) The application and marketing of the product and benefits is part of the value to the off-taker. (step 6)

1) Without Qualified Social and Renewable Impact (QSRI) sites there are no opportunities for renewable generation to produce the MW/hrs (megawatt hours) needed to produce a Social/Equity REC, nor is there the baseline impact data to track impact KPIs.
2) Without the additional revenue component of Social RECs, financing component these QSRI sites typically lack the financial resources to be developed.
3) QSRI sites individually are challenged to produce the scale needed for a typical REC buyer or the financier in step 2, and thus an aggregated portfolio of multiple sites is key to scaling more equitable renewable development.
4) As the social/equity REC is a unique product, separate from anything currently on the market, special relationships, impact and community statistics and qualitative data is needed for the pricing, marketing, and sale of these energy attributes.
5) The sale of the social/equity RECs provides the additional revenue to make the QSRI energy project economically viable for all stakeholders including the community, the t site of the renewable asset, the financiers, and the social/equity REC purchaser.

6) To deliver on the community impact ethos of social/equity RECs, the Solar Stewards Program facilitates additional community impact partnerships central to the QSRI renewable energy project.
7) Operations and maintenance of the QSRI project is imperative in honoring social/equity REC off-taker agreements and power purchase agreements, and community benefit agreements.
8) Monitoring and qualifying the community and environmental impacts is important to furthering the adoption of both environmental AND community impact inherent in the Social/Equity Renewable Energy Credit product.

If we vet and obtain enough renewable generation directly serving the public good than this aggregate is more attractive for funding and a Social/Equity/Impact Renewable Energy Credit off-taker. If we can include the additional values of community impact, marketing, and visibility of the QSRI renewable energy source, Social/Equity/Impact RECs can be priced to make the project economically viable and socially beneficial, where it typically may not otherwise be for all stakeholders.

By following the above listed steps, a unique energy attribute is created which lends more equity to renewable energy development.

The mechanisms disclosed herein may include of the above listed elements.

This specifically mechanism generating a market rate IRR (internal rate of return) for the investors and a beneficial PPA (power purchase agreement) rate for the QSRI renewable site as well as sufficient proceeds for development and legal costs.

The Solar Stewards Program facilitates all aspects of this interlinked value chain to bring the unique Social/Equity REC product to market, which in turn creates a competitive advantage in the development of renewable projects that serve historically excluded communities.

Social/Equity Renewable Energy Credits (Social RECS) allow for more equitable renewable energy development by providing an additional income stream to make renewable energy applications benefiting the public good economically viable to all stakeholders.

Through the Solar Stewards Program, we obtain, and vet portfolios of QSRI sites to reach enough scale for more economic financing opportunities, as well as create enough volume for the typical energy attribute purchaser/offtaker. Because of the direct social and environmental impact of providing On-site distributed generation renewables to historically excluded and with our qualitative impact metrics, we can command a price for our Social/Equity RECs that generates enough internal rate of return (IRR) to satisfy renewable assets investors, and financiers. including Power Purchase Agreements (PPA) that offer the community significant savings on their electricity spend. To fulfill the Social/Equity Impact inherent in a Social/Equity Renewable Energy Credit, the Solar Stewards Program also facilitates various workforce development, advocacy, and STEAM programs utilizing the distributed generation On-site renewable technology.

1) Locate and QSRI projects serving historically excluded communities This could look like 20 individual schools, or 10 affordable housing buildings, for example. Vetting includes qualifying impact use case (population), obtaining impact data such as energy burden, historically redlined HUD Zone etc., (location—see scoping doc for inputs) 2) Partner with mission aligned solar financing providers, including green banks, impact investors, tax equity investors, solar lessors, offering accessible financing with competitive rates and flexible terms. This could look like LMI (low-moderate income developers employing leasing models to those with low to mid credit scores, or green banks offering low cost financing.
3) Input impact metrics, including QSRI site user demographics, income levels and other intrinsic values used to determine the dynamic pricing for the "Social/Equity REC product.
4) Source and Educate the energy attribute buyer for Social/Equity RECs though key relationships and market and sell them on the best price/term for all stakeholders in the Solar Stewards Program. These general stakeholders include: 1) The site where the QSRI renewables are located. 2) The community that uses the QSRI 3) The financier providing capital to deploy the QSRI assets are located 4) The Social REC purchaser 5) Execute all Social REC Off-taker agreements and manage the development of the QSRI.
6) Monitor operations to ensure they are in compliance with the Social/Equity REC offtaker agreement, 7) Deliver on the additional impact inherent in the Social/Equity REC product via the Solar Stewards Program by supporting community partners' impact programs using the QSRI renewable as a training/learning tool, as well as public relations and advocacy.

One element, is the ability to create a unique energy attribute, (entitled Social/Equity/Impact Renewable Energy Credits) from QSRI renewable energy generation projects that serve the public good, and price this product to include all value propositions as described for the benefit of all stakeholders.

that are sourced primarily from distributed generation renewables located on site, create a direct community impact, and command a unique price because of these additional values, where traditional RECs do not. This added value creates the unique pricing that enables the Solar Stewards program to develop more economically viable QSRI projects. It's a virtuous cycle and a fully integrated process.

Similar claims to the community impact and subsequent value of RECs generated from renewable sources located near, on, or serving the public good could enter the market, however without steps mentioned herein to ensure legitimacy and tangible impact throughout the value chain that constitutes the Social/Equity/Impact REC product, there is the potential for misuse and "social-washing."

Renewable energy developers can utilize Social/Equity/Impact renewable energy credits to realize additional project revenue on projects serving the public good.

Renewable energy producers can realize a new revenue stream and/or benefit from better project economics and savings on energy expenditures.

Our Social/Equity/Impact REC purchasers/off-takers realize both an environmental goal in the form of carbon reduction, as well as community impact and marketing/PR opportunities.

Tax Equity investors get all affiliated tax credits with the QSRI array, impact investors receive a competitive return.

Residents of the community in which the DG site is based are provided with workforce development resources, STEAM learning tools etc.

The Social/Equity/Impact Renewable Energy Credit Product can also be utilized within a blockchain framework that will allow for a streamlining/automation of the authentication of the Social/Equity/Impact REC product.

The inclusion of both qualitative and quantitative data to price an attribute to include and produce more equitable outcomes can apply to data, machine learning, water and mineral rights, and all sustainability measures.

The Social/Equity/Impact Renewable Energy Credit Product can also be utilized within a blockchain framework that will allow for a streamlining/automation of the authentication of the Social/Equity/Impact REC product. As blockchain advances in this application, it will make off-grid and international DG sites eligible for purchase. This added revenue will facilitate the development of more DG renewables, i.e.: Solar Stewards process.

The Solar Stewards Program creates the opportunity for the scaling, and financing of QSRI renewable applications, including distributed generation (DG) renewables combined with community impact to yield a unique social impact product in the energy attribute space. The same could be applied to Carbon Offsets and other future energy and environmental attribute frameworks.

Environmental attributes are any and all claims, credits, benefits, emissions reductions, offsets, and allowances, howsoever entitled, resulting from the avoidance of the emission of any gas, chemical or other substance to the air, soil or water.

A Renewable energy credit typically indicates one megawatt-hour (MWH) of electricity was generated and fed into the grid from an eligible renewable source.

Figure 3:
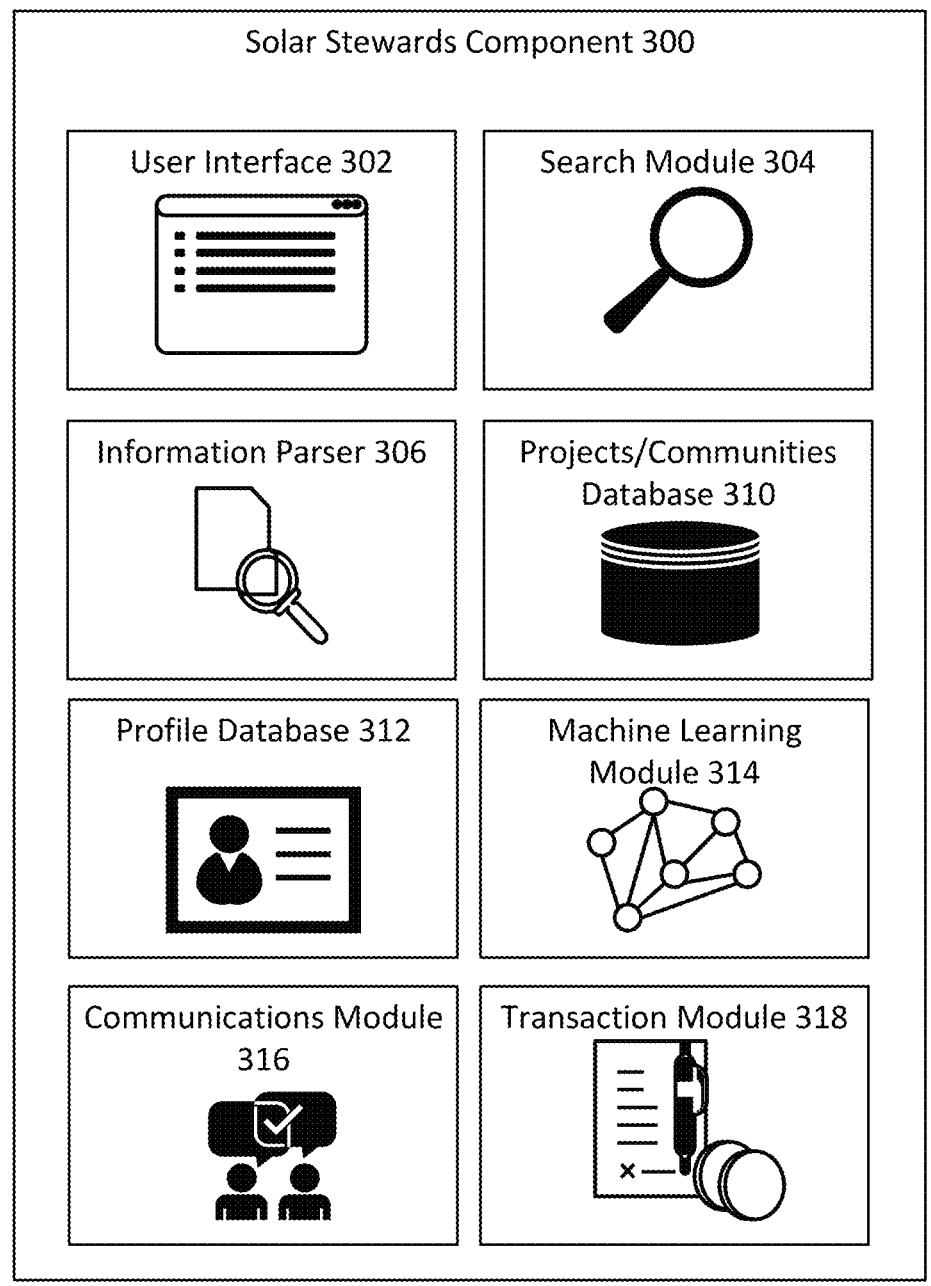
FIG. 3 is a block diagram illustrating a system for streamlining renewable energy resource allocation via a user interface.

FIG. 3 is a block diagram illustrating a system for streamlining renewable energy resource allocation via a user interface. In particular, FIG. 3 includes solar stewards component 300, which may be a software application that is installed on a computer system (described in FIG. 9).

Solar stewards component 300 enables corporate buyers of renewable energy to shop and purchase Social-RECs, view upcoming opportunities, track, and view community impact, and generate case studies on Corporate Social Responsibility (CSR) benefits. In particular, solar stewards component 300 allows for small, distributed generators (DG) in HEC with applications that serve the most vulnerable to onboard their Social-RECs eligible projects in a simplified and inclusive process. This process includes information such as demographics, supplier diversity, and community benefit as a requirement.

A purpose of solar stewards component 300 is to enable users (e.g., corporations) looking to invest in renewable energy projects in various communities to view an aggregation of key data points about the projects and communities. Moreover, solar stewards component 300 provides project and community recommendations to improve visibility in the user interface. For example, there may 1000 projects that a user may need to sift through in a conventional user interface. Due to time constraints and fatigue, the user may only be able to navigate and consider a fraction of the projects. However, the user may be unable to view the project most relevant to him/her. Because of this, the user may be deterred from investing altogether. At the rate at which underserved communities are gaining access to renewable energy resources, if this were to happen to all users of conventional renewable energy allocation solutions, climate change will continue to be an issue.

Unlike conventional solutions described above, solar stewards component 300 generates a profile of the user and receives their goals and community/project preferences. Based on the profile, solar stewards component 300 presents a more relevant and easy-to-navigate user interface that includes projects and communities that the user has a higher likelihood of investing in. This results in benefits such as a better user experience, accurate recommendations, quicker investments, less time wasted in search queries, quicker access to resources by underserved communities, and, in turn, mitigation of climate change effects when adopted by enough users.

In some aspects, solar stewards component 300 may be a web-based application installed on a server. In some aspects, solar stewards component 300 may be split into a thin client application and a thick client application. For example, the thin client application may enable basic user interaction (e.g., on a website) such as receiving and outputting data. The thick client application may process the received data and transmit the output(s) to the thin client application. The thin client application may be installed or accessible on a computing device of the user such as a smartphone or laptop. The thick client application may be installed on a remote server that the smartphone or laptop connects to (e.g., via the Internet).

Solar stewards component 300 may include a plurality of modules including user interface 302, search module 304, information parser 306, projects/communities database 310, profile database 312, machine learning module 314, communications module 316, and transaction module 318.

Figure 4:
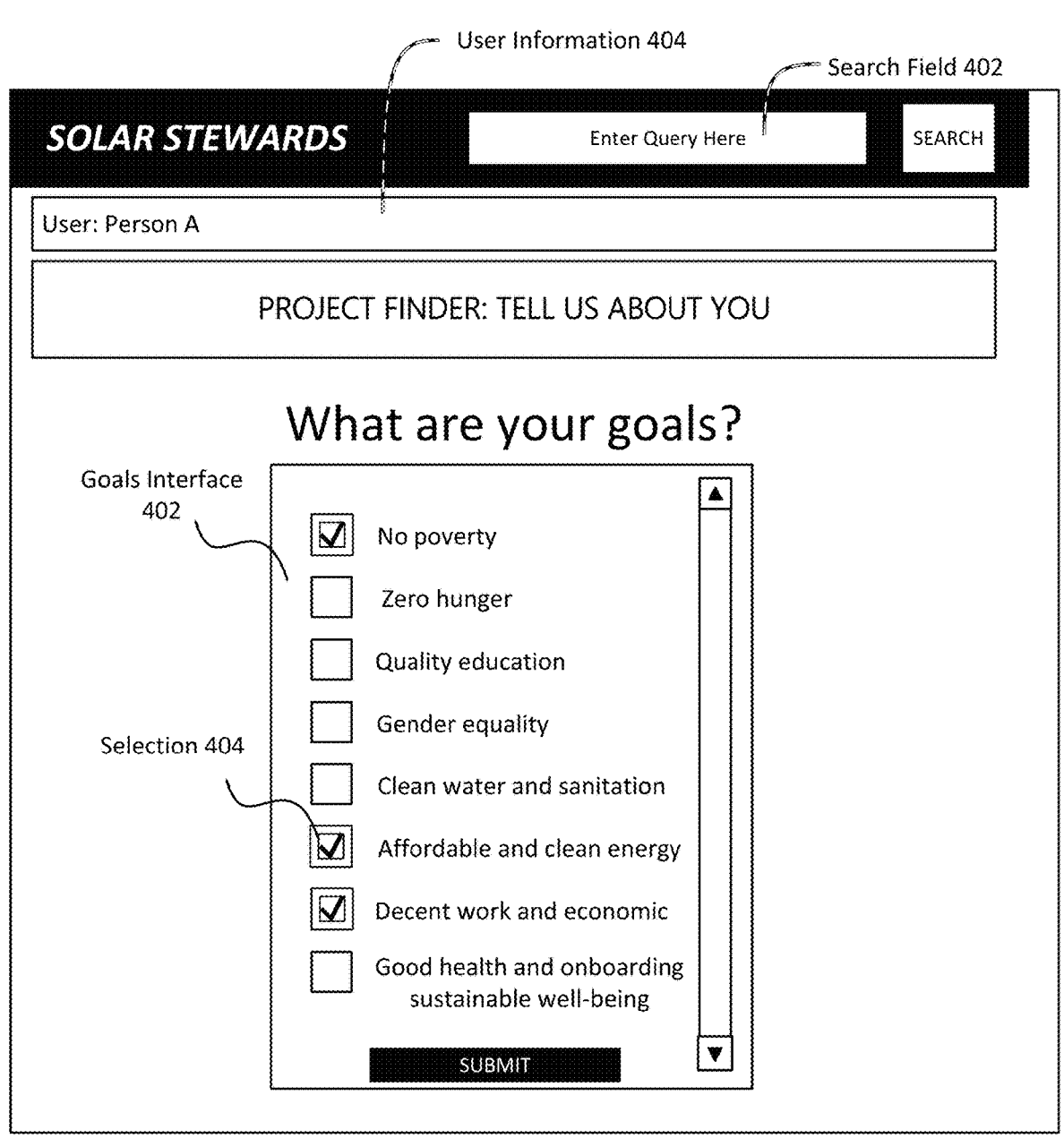
FIG. 4 is an exemplary user interface that receives profile information about a user.

FIG. 4 is an exemplary user interface 400 (corresponding to user interface 302 of FIG. 3) that receives profile information about a user. For example, user interface 400 may be a visual interface on a website that comprises any combination of buttons, dropdown menus, text, images, videos, etc. For simplicity, user interface 400 is shown in FIG. 4 to include search field 402, user information 404, goals interface 402, and selection 404. It should be noted that user interface 400 may include additional features and visuals not shown in FIG. 4.

The functionality depicted in FIG. 4 of solar stewards component 400 involves profile generation. In particular, a user may create an account or log-in to an account on user interface 400. When provided login credentials via user interface 400, solar stewards component 300 may search for the login credentials in profile database 312. Profile database 312 may include a plurality of profiles that include information about users such as corporate workers, philanthropists, energy investors, project developers, government workers, etc.

Each profile in profile database 312 includes basic information about a user such as name, address, company name, budget, etc. Some of this information may be presented on user interface 400 (e.g., user information 404). In addition, each profile includes goal information. For example, user interface 400 may generate goals interface 402, such as a query box, that asks the user about their goals during profile generation. The goals may be changed by the user by accessing their profile settings via user interface 400. In FIG. 4, the query box includes a plurality of goal options to select from including, but not limited to, no poverty, zero hunger, quality education, etc. A user may then make selections (e.g., selection 404), and solar stewards component 300 stores the selection(s) in profile database 312 in the user's profile.

FIG. 4 also includes search field 402, in which a user may enter queries to search for information about projects and communities. Search module 304 may search for the query in projects/communities database 310, communications module 316, and transaction module 318. For example, the user may search for the term "DetroitSolar," which may be a project in projects database 310. In response to detecting a webpage detailing information about the project, search module 304 may output the webpage on user interface 400. In another example, the user may search for a particular attribute (e.g., "communities with populations over 1,000, 000") and search module 304 may output projects/communities that match that attribute (in a page format similar to FIG. 7).

Figure 6:
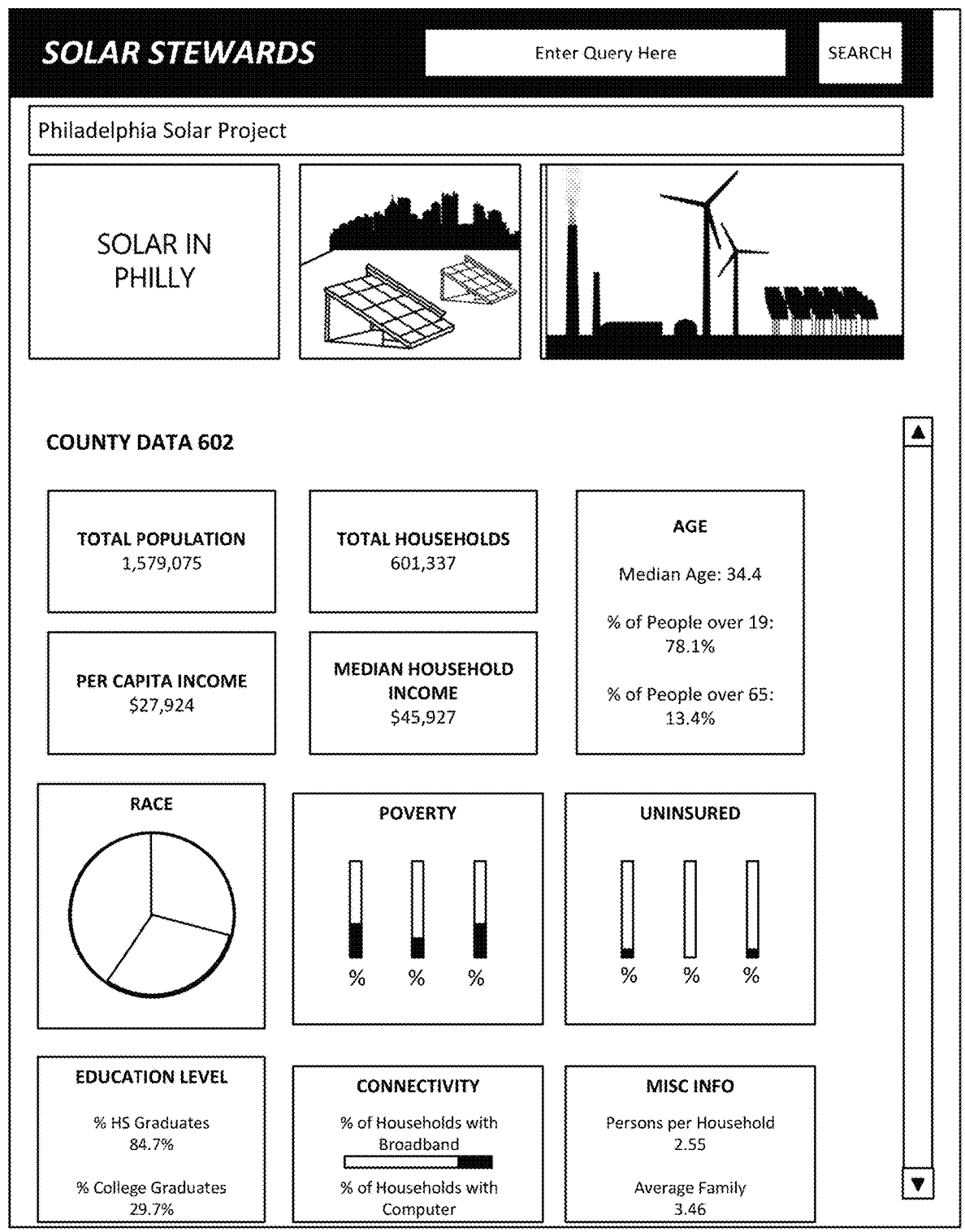
FIG. 6 is the exemplary user interface presenting additional information about the selected project.

In some aspects, information in projects/communities database 310 is manually entered by a managing/developing team of solar stewards component 300. In some aspects, in order to generate information about different projects and communities, solar stewards component 300 utilities information parser 306, which may scan different sources available over the Internet (e.g., websites, images, videos, documents, etc.) and extract information about available/future renewable energy projects and community statistics. Information parser 306 may include web-crawling features, and may, in some aspects, execute machine learning and natural language processing to identify targeted information such as when a project will be developed/complete, etc. Information parser 306 may then plug the information extracted into webpage templates to produce informational pages about communities and projects. An exemplary webpage about a project "solar in philly" is shown in FIGS. 5-6.

FIG. 5 is exemplary user interface 400 presenting information about a selected project. User interface 400 as shown in FIG. 5 may be a webpage that describes a specific project in a community. For example, "solar in philly" represents a project in Philadelphia involving rooftop solar panels. User interface 400 includes site graphics 502 (e.g., logo, photos, etc.), site details 504 (e.g., location), community partner information 506 (e.g., owner name), specifics 508 (e.g., status, energy burden, etc.), transactions window 510 (e.g., for investing), communications window 511, and social impact information including communities served 512, mission 514, people served 516. The social impact portion of user interface 400 may include attributes that match the goals of the user. For example, a user may be interested in reducing poverty rates and communities served 512 indicates persistent poverty in the community. This suggests that the project may be relevant to the user.

Transaction module 318 is configured to generate transactions window 510, which displays financial information such as project price, costs to implement, etc., and receives bids/purchase requests. For example, in FIG. 5, the user has entered a bid for $800. In some aspects, the user may have access to buy the project outright and bypass the bidding process (e.g., the user may have premium access to the software). In some aspects, if a user has entered a bid, transaction module 318 stores the bid in a central database and synchronizes bids from other users. Based on the bidding timeline (e.g., the duration of the auction), transaction module 318 may compare the bids and inform the user of whether they have the highest bid. In some aspects, a member of the project development team may use transaction module 318 to review the bids and select one. If a particular bid is accepted by the project development team, the user is informed on user interface 400. In some aspects, this may involve transaction module 318 generating a text, email, or visual window on user interface 400 informing the user that they won/did not win the auction.

Communications module 316 enables the user to communicate with other users of solar stewards component 300. For example, the user may access communications window 511 and join a text-based, audio-based (e.g., call), video-based (e.g., video call), augmented reality-based, or virtual reality-based conversation with another user. In some cases, the other user may be someone from the project development team. In other cases, the other user may be a collaborator. For example, the user and the other user may agree on a collaborative bid for a project (e.g., both users may agree to equally split a $1000 bid, enabling them to maintain individual budgets and still be competitive for highest bid).

FIG. 6 is exemplary user interface 400 presenting additional information about the selected project. Suppose that the user continues to scroll down on user interface 400, FIG. 6 depicts the resulting user interface view. In particular, the user may be able to view county data 602 about the community where the project is located. For example, county data 602 may include information about population count, household count, age statistics, income statistics, racial distribution, poverty rates, the rate of people insured (e.g., depending on age, race, etc.), education rates, connectivity information, etc.

In a specific example, a webpage for a project/community may include the following information: location data (both county and GPS coordinates), county level social data, including total population, per capita income, total households, race and ethnicity, median household income, median age,% of people over 18, % of people over 65, % of people below poverty line, % of people over 65 below poverty line, % of people under 18 below poverty line, uninsured rates, unemployment levels, education levels (e.g., % high school graduates, % college graduates, etc.),% of households with broadband, % of households with a computer, % of households with a smartphone, number of persons per household, average family size, % of households speaking a language other than English (e.g., Spanish), % of veterans, etc.

Figure 7:
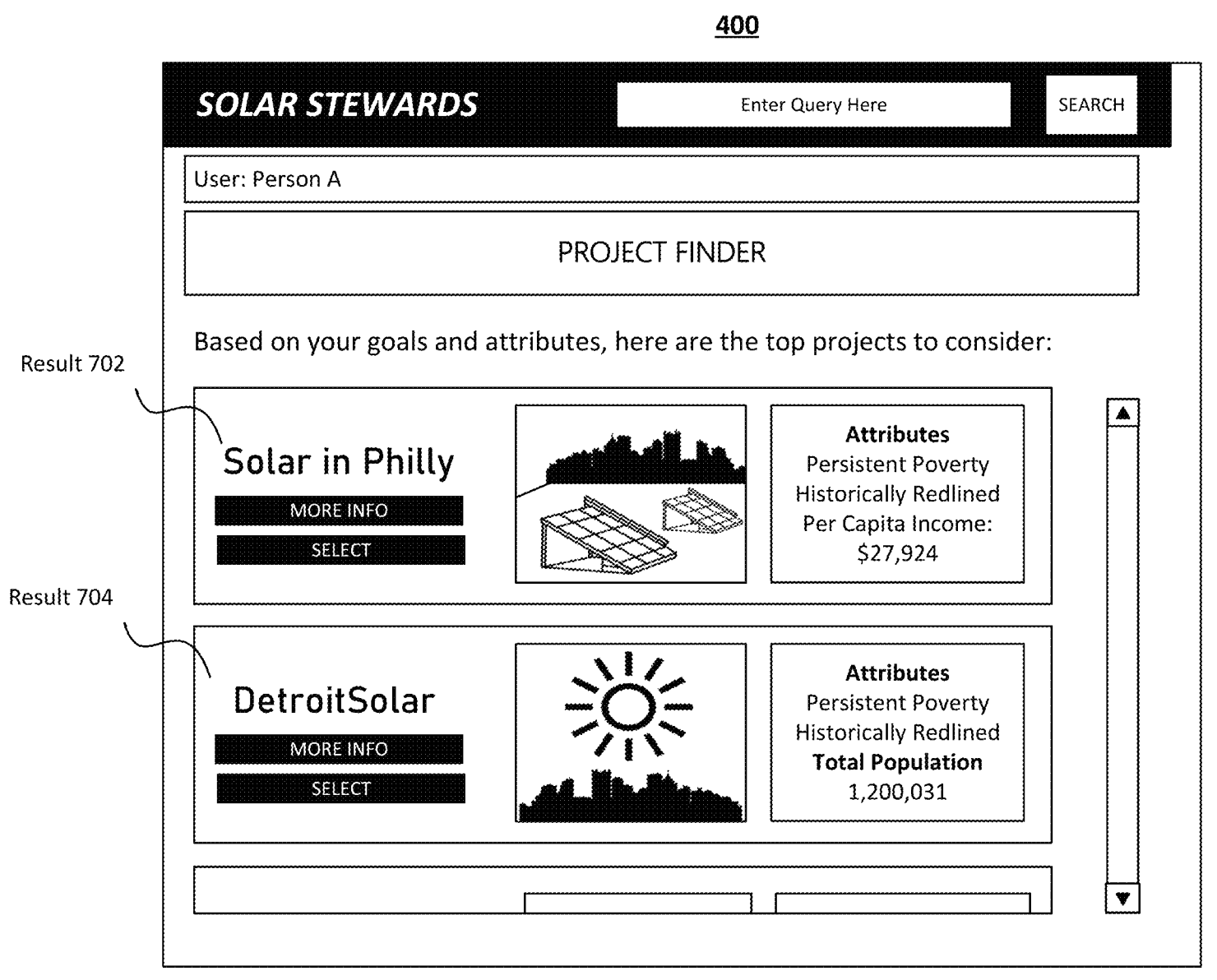

FIG. 7 is exemplary user interface 400 outputting projects that are relevant to the user based on the received profile information. As discussed previously, solar stewards component 300 improves access to renewable energy projects via recommendations generated based on the goals of users. For a pair including a project and a user seeking to invest, there are two goal sets to consider. The first is the goal of the project development team. For example, the project development team may look for investors that have a certain budget, size, time active, experience, etc. An investor may look for a project in a particular community, involving a particular renewable energy, having a certain time to completion, return on investment, size, etc.

As discussed previously, each user, project, and community has a list of attributes. For a user (e.g., an investor), this attribute may include name, address, years active, size (e.g., employees), budget (e.g., bidding power), the goals of the investor. The attributes of a project may be size (e.g., amount of energy produced), material, costs, etc. The attributes of a community may be size (e.g., population), poverty rate, education rate, etc. (see FIG. 6). An ideal match between user, project, and community involves each of goals and attributes completely matching between the three entities. However, a perfect match may not be possible, and certain attributes may not be dealbreakers for users/project developers. Thus, solar stewards component 300 generates recommendations with the highest match scores (e.g., the highest likelihood of being invested in).

In FIG. 7, user interface 400 presents the user with results 702 and 704. These results are two projects that are determined to be the most relevant to the user based on the goals of the project developers and the goals of the user. In some aspects, the results may be listed in a ranking format. For example, result 702 may be more relevant to the user than result 704.

Machine learning module 314 generates the recommendations by comparing the profile of the user, which includes goals and attributes, with the profiles of all projects and communities in projects/communities database 310. Machine learning module 314 determines a relevance score $s=f(x)$ for each input $x=(u, p_n)$ where u is a user profile and p is a profile for the nth project. When the relevance scores are determined, machine learning module 314 sorts (i.e. rank) the projects according to the scores.

In some aspects, machine learning module 314 is a vector space model (e.g., term frequency-inverse document frequency (tf-idf) that computes a vector embedding for each user and project profile, and then computes the relevance score $f(x)=f(u, p_n)$ as the cosine similarity between the vectors embeddings of u and $p_n$.

In some aspects, each of the attributes and goals may be weighted differently by the user/project. For example, a user may prefer wind-based renewable energy projects more than solar-based renewable energy projects. The user may also prefer local projects more than projects in other communities/countries. When generating a profile of the user, user interface 400 may request a level of importance for the goal. For example, the user may select a goal to serve communities within a 50 mile radius. User interface 400 may then ask how important is it for the community to be within the 50 mile radius. For example, user interface 400 may ask the user to rate the goal on a scale of 1-5, where 1 is not important and 5 is very important. Based on the weights selected, machine learning module 314 may perform the vector embeddings such that goals with more importance (as indicated by the user) have terms that show more frequently for the tf-idf. For example, if local communities are of the utmost importance and the user is based in Detroit, the term "Detroit" may be listed 5 times (proportional to the selected weight) in the profile. Accordingly, the term appears frequently in for the machine learning module 314.

In some aspects, machine learning module 314 may execute a decision tree to determine whether to recommend the project to a user. For example, the decision tree may compare the goals of the user and the project against one another's attributes and generate a verdict of whether to present the project to the user.

Figure 8:
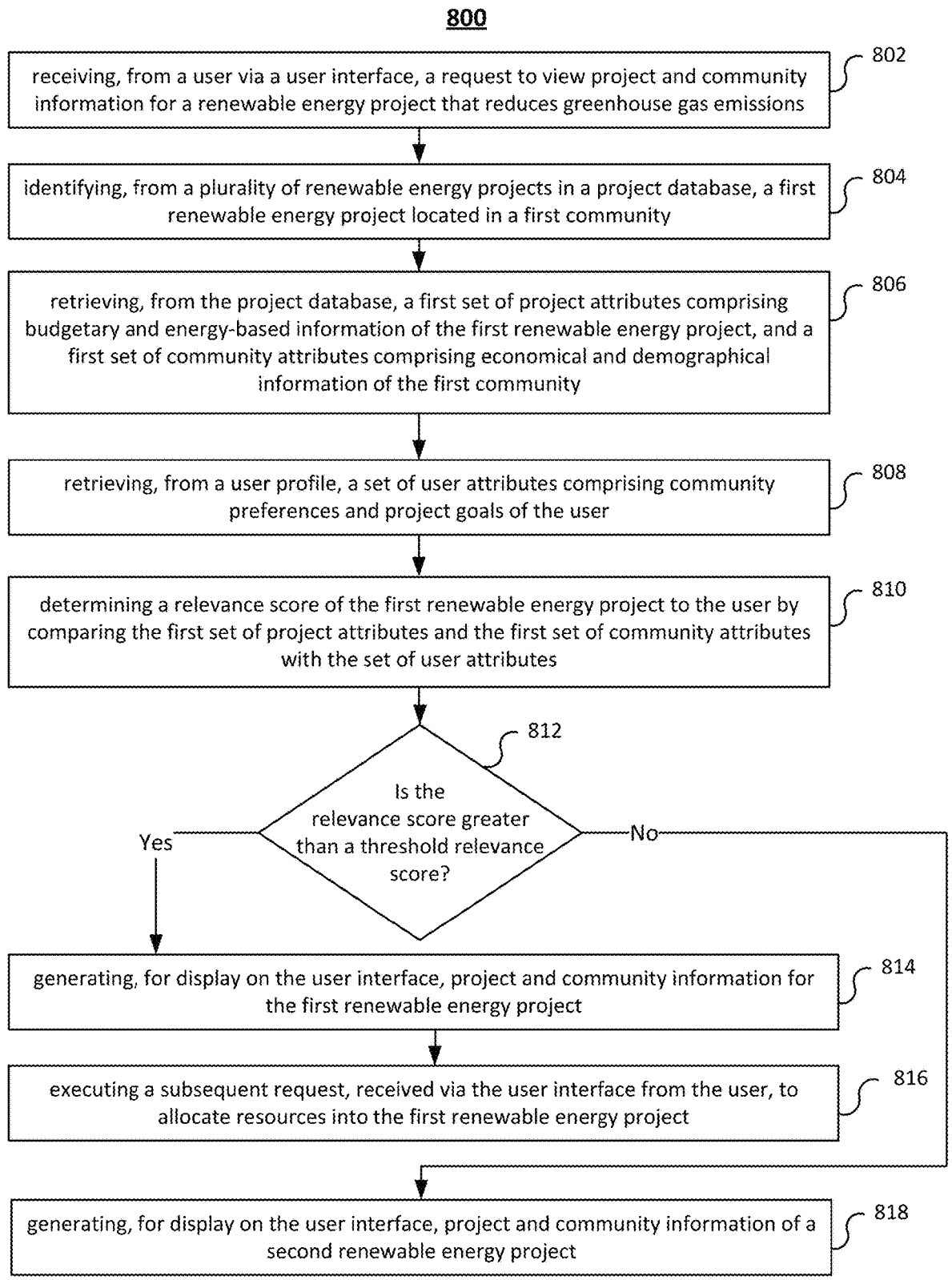
FIG. 8 is a flow diagram illustrating a method for streamlining renewable energy resource allocation via a user interface.

FIG. 8 is a flow diagram illustrating method 800 for streamlining renewable energy resource allocation via a user interface. At 802, solar stewards component 300 receives, from a user via user interface 302, a request to view project and community information for a renewable energy project that reduces greenhouse gas emissions.

At 804, solar stewards component 300 identifies, from a plurality of renewable energy projects in project database 310, a first renewable energy project located in a first community. For example, the first renewable energy project may be "solar in philly" in a first community within Philadelphia.

At 806, solar stewards component 300 retrieves, from project database 310, a first set of project attributes comprising budgetary and energy-based information of the first renewable energy project, and a first set of community attributes comprising economical and demographical information of the first community.

In some aspects, the first set of project attributes includes, for a given renewable energy project, at least one of: (1) a project cost (e.g., $5000), (2) an energy generation value (e.g., 500 MWH annually), (3) a renewable energy type (e.g., solar, wind, etc.), (4) an energy efficiency value (e.g., solar panel produces 300 watts of power from 1000 watts of sunlight −30% efficiency), (5) a project time window (e.g., estimated installation completion of ten panels in 1 month). It should be noted that any descriptor of a project, as described previously, may be included in the first set of project attributes.

In some aspects, the first set of community attributes includes, for a given community, at least one of: (1) a community population (e.g., 1,579,075), (2) a racial distribution (e.g., 10% Asian, 15% African American, etc.), (3) a wealth distribution (e.g., per capita income, number of households, minimum wage, salaries, etc.), (4) a gender distribution, (5) an indication of being underserved or not underserved (e.g., as indicated by data or by a government report), (6) an energy usage distribution (e.g., amount of energy used per household, number of outages, percentage of renewable energy, amount of waste, etc.). It should be noted that any descriptor of a community, as described previously, may be included in the first set of community attributes (e.g., see FIG. 6).

At 808, solar stewards component 300 retrieves, from a user profile, a set of user attributes comprising community preferences and project goals of the user. Prior to receiving the request at 802, solar stewards component 300 may receive, via user interface 302, a request to generate the user profile. For example, the user may create a new login credential. In response, solar stewards component 300 may generate, for display on user interface 302, a plurality of queries that request information about community preferences and project goals of the user (e.g., see FIG. 4). Solar stewards component 300 may then build the set of user attributes based on received responses to the plurality of queries. In some aspects, each query may be directly related to an attribute. For example, the user may be asked to define a population limit/range. The defined population limit is stored as a user-set population limit.

In some aspects, the community preferences in the set of user attributes comprises, for a given community, at least one of: (1) a user-set population limit, (2) a user-set racial distribution, (3) a user-set wealth distribution, (4) a user-set gender distribution, (5) an indication of being underserved, (6) a user-set energy usage distribution. These user attributes mirror the community attributes described above, but instead include the desired (e.g., user-set) attributes of the user. For example, the user may want for the community they fund or invest in to have a certain population, a certain racial distribution, etc. When considering whether the first community corresponds to the community preferences of the user, solar stewards component 300 does a one-to-one analysis for each attribute (e.g., comparing a community population against the user-set population limit).

Similarly, the project goals in the set of user attributes include, for a given renewable energy project, at least one of: (1) a user-set project cost limit, (2) a user-set energy generation value, (3) a user-set renewable energy type, (4) a user-set energy efficiency value, (5) a user-set project time window. When considering whether the first renewable energy project corresponds to the project goals of the user, solar stewards component 300 does a one-to-one analysis for each attribute (e.g., comparing a project energy generation value against the user-set (i.e., user-defined minimum/maximum) energy generation value).

In some aspects, the set of user attributes may be split into a set of project goals and a set of community preferences.

At 810, solar stewards component 300 determines a relevance score of the first renewable energy project to the user by comparing the first set of project attributes and the first set of community attributes with the set of user attributes. For example, each of the first sets may be merged into a single vector and the set of user attributes may be a second vector. Solar stewards component 300 may calculate the cosine similarity between the vectors, and the output is deemed to be the relevance score.

In some aspects, determining the relevance score of the first renewable energy project to the user comprises executing a machine learning model configured to receive an input set of user attributes and generate an output relevance score. The machine learning model may be trained based on a training dataset comprising a plurality of input user attributes, input project attributes, input community attributes, and output indicators of relevance.

At 812, solar stewards component 300 determines whether the relevance score is greater than a threshold relevance score. In response to determining that the relevance score is greater than a threshold relevance score, method 800 advances to 814, where solar stewards component 300 generates, for display on user interface 302, project and community information for the first renewable energy project. For example, user interface 302 may display the contents shown in FIGS. 5-6.

From 814, method 800 advances to 816, where solar stewards component 300 executes a subsequent request, received via the user interface from the user, to allocate resources into the first renewable energy project. For example, the resources to allocate may be monetary funds, the subsequent request may be a request to buy/bid for the first renewable energy project (e.g., see transactions window 510).

If at 812 solar stewards component 300 determines that the relevance score is not greater than the threshold relevance score, method 800 advances to 818, where solar stewards component 300 generates, for display on the user interface, project and community information of a second renewable energy project (e.g., "DetroitSolar").

In some aspects, generating the project and community information of the second renewable energy project is further in response to determining that another relevance score of the second renewable energy project is greater than the threshold relevance score.

Similar to calculating the relevance score of the first renewable energy project, solar stewards component 300 may calculate the another relevance score of the second renewable energy project by retrieving, from project database 310, a second set of project attributes of the second renewable energy project, and a second set of community attributes of a second community where the second renewable energy project is located. Solar stewards component 300 may then determine the another relevance score of the second renewable energy project to the user by comparing the second set of project attributes and the second set of community attributes with the set of user attributes.

In some aspects, solar stewards component 300 may further determine a respective relevance score for each of the plurality of renewable energy projects to the user. Solar stewards component 300 may then rank each respective relevance score from highest to lowest, and generate, for display on user interface 302, respective project and community information for the plurality of renewable energy projects based on the ranking. For example, user interface 302 may display the contents shown on FIG. 7.

Figure 9:
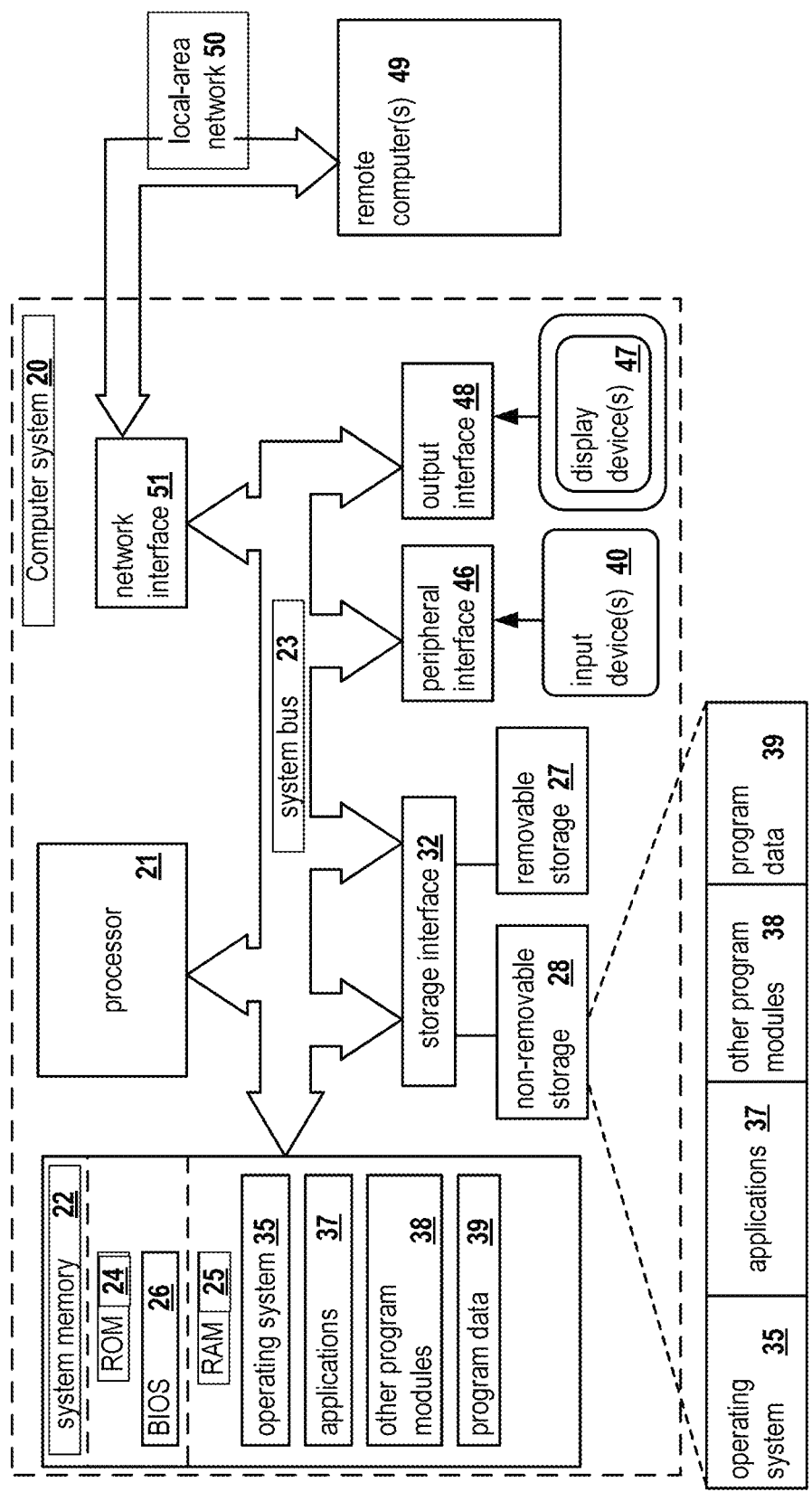
FIG. 9 presents an example of a general-purpose computer system on which aspects of the present disclosure can be implemented.

FIG. 9 is a block diagram illustrating a computer system 20 on which aspects of systems and methods for streamlining renewable energy resource allocation via a user interface may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-8 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for streamlining renewable energy resource allocation, the method comprising:
receiving, from a user via a user interface, a request to view information for a renewable energy project that produces renewable energy and reduces emissions;
identifying, from a project database of a plurality of renewable energy projects that produce renewable energy, a first renewable energy project located in a first location, wherein the database has a hierarchy of programmable interconnects that allow logic blocks to be interconnected as needed;
retrieving from the project database a first set of project attributes comprising additional information of the first renewable energy project and a first set of community attributes comprising economical and demographical information of a first community;
retrieving from a user profile a set of user attributes comprising community preferences and project goals of the user;
utilizing a mathematical model configured to calculate a relevance score of the first renewable energy project based on a plurality of parameters associated with a dynamic equity equation,
wherein the mathematical model is a multiple regression model with independent variables that operate based on an estimated multiple regression equation, and
wherein the mathematical model is updated using a plurality of input user attributes, input project attributes, input community attributes, output indicators of relevance;
utilizing the mathematical model to compare the first set of project attributes and the first set of community attributes with the set of user attributes and dynamically perform a plurality of functions associated with predicting an ability to complete a community goal by a predetermined date based on a calculated relevance score,
wherein the mathematical model is a vector space model that computes a vector embedding for each user and project profile, and then computes the relevance score $f(x)=f(u, Pn)$ as the cosine similarity between the vector embeddings of u and Pn;
in response to calculating that the relevance score is greater than a threshold relevance score, generating and displaying on the user interface, project and community information for the first renewable energy project;
executing a subsequent request, received via the user interface from the user, to allocate resources into the first renewable energy project;
using the mathematical model to predict resources required by a second renewable energy project at a second location based on the calculated relevance score of the first renewable energy project by executing a decision tree;
updating the mathematical model using new data points compared to the predictions of future values and conducting an error analysis to update the model to reduce errors and bias; and
managing a portion of an electrical grid by using further processor-executable instructions configured for:
causing energy from a production site of a first renewable energy project to be delivered over the electrical grid to a requester in compliance with a first off taker agreement based on the prediction of an ability to complete a community goal by a predetermined date based on a calculated relevance score and the relevance score being greater than a threshold relevance score,
allowing the requester to withdraw electric energy from the electrical grid based on the renewable energy produced at the production site of the first renewable energy project in compliance with the first off taker agreement,
causing energy from a production site of a second renewable energy project to be delivered over the electrical grid to the requester in compliance with a second off taker agreement based on the prediction of resources required by the second renewable energy project at a second location based on the calculated relevance score of the first renewable energy project, and
allowing the requester to withdraw electric energy from the electrical grid based on the renewable energy produced at the production site of the second renewable energy project in compliance with the second off taker agreement.

2. The method of claim 1, further comprising:
in response to determining that the relevance score is not greater than the threshold relevance score, generating project and community information of a second renewable energy project and displaying it on the user interface.

3. The method of claim 2, wherein generating the project and community information of the second renewable energy project is further in response to determining that another relevance score of the second renewable energy project is greater than the threshold relevance score.

4. The method of claim 3, wherein determining the another relevance score comprises:
retrieving, from the project database, a second set of project attributes of the second renewable energy project, and a second set of community attributes of a second community where the second renewable energy project is located; and
determining the another relevance score of the second renewable energy project to the user by comparing the second set of project attributes and the second set of community attributes with the set of user attributes.

5. The method of claim 1 further comprising, prior to receiving the request:
receiving, via the user interface, a request to generate the user profile;
generating and displaying on the user interface, a plurality of queries that request information about community preferences and project goals of the user; and
building the set of user attributes based on received responses to the plurality of queries.

6. The method of claim 1, wherein the community preferences in the set of user attributes comprises, for a given community, at least one of: (1) a user-set population limit, (2) a user-set racial distribution, (3) a user-set wealth distribution, (4) a user-set gender distribution, (5) an indication of being underserved, and (6) a user-set energy usage distribution.

7. The method of claim 1, wherein the first set of community attributes comprises, for a given community, at least one of: (1) a community population, (2) a racial distribution, (3) a wealth distribution, (4) a gender distribution, (5) an indication of being underserved or not underserved, and (6) an energy usage distribution.

8. The method of claim 1, wherein the project goals in the set of user attributes comprises, for a given renewable energy project, at least one of: (1) a user-set project cost limit, (2) a user-set energy generation value, (3) a user-set renewable energy type, (4) a user-set energy efficiency value, and (5) a user-set project time window.

9. The method of claim 1, wherein the first set of project attributes comprises, for a given renewable energy project, at least one of: (1) a project cost, (2) an energy generation value, (3) a renewable energy type, (4) an energy efficiency value, and (5) a project time window.

10. The method of claim 1, further comprising:
determining a respective relevance score to the user for each of the plurality of renewable energy projects;
ranking each respective relevance score from highest to lowest; and
generating and displaying on the user interface, respective project and community information for the plurality of renewable energy projects based on the ranking.

11. The method of claim 1, wherein determining the relevance score of the first renewable energy project to the user comprises executing a mathematical model configured to receive an input set of user attributes and generate an output relevance score.

12. The method of claim 1, wherein the resources to allocate are monetary funds, and wherein the subsequent request is a request to buy the first renewable energy project.

13. The method of claim 1 wherein the allocation of energy is by means of at least one power grid on the basis of the renewable energy credits.

14. The method of claim 1 further including a plurality of production sites whose first data structures have been aggregated in memory, and wherein the energy from the plurality of production sites is allocated to a requester.

15. A system for streamlining renewable energy resource allocation, comprising:
a memory in which information about a plurality of renewable energy projects is stored as a project database, wherein the database has a hierarchy of programmable interconnects that allow logic blocks to be interconnected as needed; and
a hardware processor communicatively coupled with the memory and configured to:
receive, from a user via a user interface, a request to view information for a renewable energy project that produces renewable energy and reduces emissions;
identify, from a plurality of renewable energy projects in a project database that produce renewable energy, a first renewable energy project that produces renewable energy at a first location;
retrieve, from the project database, a first set of project attributes comprising additional information of the first renewable energy project, and a first set of community attributes comprising economical and demographical information of the first community;
retrieve, from a user profile, a set of user attributes comprising community preferences and project goals of the user;
utilizing a mathematical model configured to calculate a relevance score of the first renewable energy project based on a plurality of parameters associated with a dynamic equity equation,
wherein the mathematical model is updated using a plurality of input user attributes, input project attributes, input community attributes, and output indicators of relevance;
wherein the mathematical model is a multiple regression model with independent variables that operate based an estimated multiple regression equation;
utilize the mathematical model to compare the first set of project attributes and the first set of community attributes with the set of user attributes, and
dynamically perform a plurality of functions associated with predicting an ability to complete a community goal by a predetermined date based on a calculated relevance score;
wherein the mathematical model is a vector space model that computes a vector embedding for each user and project profile, and then computes the relevance score $f(x)=f(u, Pn)$ as the cosine similarity between the vector embeddings of u and Pn;
in response to calculating that the relevance score is greater than a threshold relevance score, generate and display on the user interface, project and community information for the first renewable energy project;
execute a subsequent request, received via the user interface from the user, to allocate resources into the first renewable energy project; and
using the mathematical model to predict a number of resources required by a second renewable energy project that produces renewable energy at a second location based on the calculated relevance score of the first renewable energy project by executing a decision tree;
updating the machine learning model using new data points compared to the predictions of future values and conducting an error analysis to update the model to reduce errors and bias;
managing a portion of an electrical grid by using further processor-executable instructions configured for:
causing energy from a production site of a first renewable energy project to be delivered over the electrical grid to a requester in compliance with a first off taker agreement based on the prediction of an ability to complete a community goal by a predetermined date based on a calculated relevance score and the relevance score being greater than a threshold relevance score,
allowing the requester to withdraw electric energy from the electrical grid based on the renewable energy produced at the production site of the first renewable energy project in compliance with the first off taker agreement,
causing energy from a production site of a second renewable energy project to be delivered over the electrical grid to the requester in compliance with a second off taker agreement based the prediction of resources required by the second renewable energy project at a second location based on the calculated relevance score of the first renewable energy project, and
allowing the requester to withdraw electric energy from the electrical grid based on the renewable energy produced at the production site of the second renewable energy project in compliance with the second off taker agreement.

16. The system of claim 15, wherein the hardware processor is further configured to:
in response to determining that the relevance score is not greater than the threshold relevance score, generate project and community information of a second renewable energy project and display it on the user interface.

17. The system of claim 16, wherein the hardware processor is further configured to generate the project and community information of the second renewable energy project in response to the mathematical model determining that another relevance score of the second renewable energy project is greater than the threshold relevance score.

18. The system of claim 17, wherein the hardware processor is further configured to determine the another relevance score by:
retrieving, from the project database, a second set of project attributes of the second renewable energy project, and a second set of community attributes of a second community where the second renewable energy project is located; and
determining the another relevance score of the second renewable energy project to the user by comparing the second set of project attributes and the second set of community attributes with the set of user attributes.

19. The system of claim 15, wherein the hardware processor is further configured, prior to receiving the request, to:
receive, via the user interface, a request to generate the user profile;
generate and display on the user interface, a plurality of queries that request information about community preferences and project goals of the user; and
build the set of user attributes based on received responses to the plurality of queries.

20. The system of claim 15, wherein the community preferences in the set of user attributes comprises, for a given community, at least one of: (1) a user-set population limit, (2) a user-set racial distribution, (3) a user-set wealth distribution, (4) a user-set gender distribution, (5) an indication of being underserved, and (6) a user-set energy usage distribution.

21. The system of claim 15 wherein the allocation of energy is by means of at least one power grid on the basis of the renewable energy credits.

22. The system of claim 15 further including a plurality of production sites whose first data structures have been aggregated in memory, and wherein the energy from the plurality of production sites is allocated to a requester.

23. A non-transitory computer readable medium storing thereon information about a plurality of renewable energy projects as a project database, wherein the database has a hierarchy of programmable interconnects that allow logic blocks to be interconnected as needed and further storing computer executable instructions for streamlining renewable energy resource allocation, including instructions for:
receiving, from a user via a user interface, a request to view information for a renewable energy project that produces renewable energy and reduces emissions;
identifying, from a project database a plurality of renewable energy projects in a project database, a first renewable energy project that produces renewable energy at a first location;
retrieving, from the project database, a first set of project attributes comprising additional information of the first renewable energy project and a first set of community attributes comprising economical and demographical information of the first community;
retrieving, from a user profile, a set of user attributes comprising community preferences and project goals of the user;
utilizing a mathematical model configured to calculate a relevance score of the first renewable energy project based on a plurality of parameters associated with a dynamic equity equation,
wherein the mathematical model is a vector space model that computes a vector embedding for each user and project profile, and then computes the relevance score $f(x)=f(u, Pn)$ as the cosine similarity between the vector embeddings of u and Pn, and
wherein the mathematical model is updated using a plurality of input user attributes, input project attributes, input community attributes, and output indicators of relevance;
utilizing the mathematical model to compare the first set of project attributes and the first set of community attributes with the set of user attributes,
in response to calculating that the relevance score is greater than a threshold relevance score, generating and displaying on the user interface, project and community information for the first renewable energy project;
executing a subsequent request, received via the user interface from the user, to allocate resources into the first renewable energy project;
using the mathematical model to predict a number of resources required by a second renewable energy project at a second location based on the calculated relevance score of the first renewable energy project by executing a decision tree;
assessing the mathematical model using new data points compared to the predictions of future values and conducting an error analysis to update the model to reduce errors and bias; and
managing a portion of an electrical grid by using further processor-executable instructions configured to:
causing energy from a production site of a first renewable energy project to be delivered over the electrical grid to a requester in compliance with first off taker agreement based on the prediction of an ability to complete a community goal by a predetermined date based on a calculated relevance score and the relevance score being greater than a threshold relevance score,
allowing the requester to withdraw electric energy from the electrical grid based on the renewable energy produced at the production site of the first renewable energy project in compliance with the first off taker agreement,
causing energy from a production site of a second renewable energy project to be delivered over the electrical grid to the requester in compliance with a second off taker agreement based on the prediction of resources required by the second renewable energy project at a second location based on the calculated relevance score of the first renewable energy project, and
allowing the requester to withdraw electric energy from the electrical grid based on the renewable energy produced at the production site of the second renewable energy project in compliance with the second off taker agreement.

24. The medium of claim 23 wherein the allocation of energy is by means of at least one power grid on the basis of the renewable energy credits.

25. The medium of claim 23 further including a plurality of production sites whose first data structures have been aggregated in memory, and wherein the energy from the plurality of production sites is allocated to a requester.

26. A method for streamlining renewable energy resource allocation, the method comprising:
receiving, from a user via a user interface, a request to view information for a renewable energy project that produces renewable energy and reduces emissions;

identifying, from a project database of a plurality of renewable energy projects that produce renewable energy, a first renewable energy project that produces renewable energy at a first location;

retrieving from the project database a first set of project attributes comprising additional information of the first renewable energy project and a first set of community attributes comprising economical and demographical information of a first community;

retrieving from a user profile a set of user attributes comprising community preferences and project goals of the user;

utilizing a mathematical model configured to calculate a relevance score of the first renewable energy project based on a plurality of parameters associated with a dynamic equity equation, wherein the mathematical model is updated using a plurality of input user attributes, input project attributes, input community attributes, and output indicators of relevance;

utilizing the mathematical model to compare the first set of project attributes and the first set of community attributes with the set of user attributes and dynamically perform a plurality of functions associated with predicting an ability to complete a community goal by a predetermined date based on a calculated relevance score, in response to calculating that the relevance score is greater than a threshold relevance score, generating and displaying on the user interface, project and community information for the first renewable energy project;

executing a subsequent request, received via the user interface from the user, to allocate resources into the first renewable energy project;

using the mathematical model to predict resources required by a second renewable energy project that produces renewable energy at a second location based on the calculated relevance score of the first renewable energy project;

updating the mathematical model using new data points compared to the predicts of future values and conducting an error analysis to update the model to reduce errors and bias;

managing a portion of an electrical grid by using further processor-executable instructions configured for:

causing energy from a production site of a first renewable energy project to be delivered over the electrical grid to a requester in compliance with a first off taker agreement based on the prediction of an ability to complete a community goal by a predetermined date based on a calculated relevance score and the relevance score being greater than a threshold relevance score, and allowing the requester to withdraw electric energy from the electrical grid based on the renewable energy produced at the production site of the first renewable energy project in compliance with the first off taker agreement, causing energy from a production site of a second renewable energy project to be delivered over the electrical grid to the requester in compliance with a second off taker agreement based on the prediction of resources required by the second renewable energy project at a second location based on the calculated relevance score of the first renewable energy project, and allowing the requester to withdraw electric energy from the electrical grid based on the renewable energy produced at the production site of the second renewable energy project in compliance with the second off taker agreement.

* * * * *